US012649114B2

(12) United States Patent
Buese

(10) Patent No.: US 12,649,114 B2
(45) Date of Patent: Jun. 9, 2026

(54) CLOSED ROTATABLE EXTRACTOR SYSTEM

(71) Applicant: BREVETS, LLC, Lewes, DE (US)

(72) Inventor: Mark A. Buese, Green Cove Springs, FL (US)

(73) Assignee: BREVETS, LLC, Lewes, DE (US)

( * ) Notice: Subject to any disclaimer, the term of this patent is extended or adjusted under 35 U.S.C. 154(b) by 785 days.

(21) Appl. No.: 17/584,727

(22) Filed: Jan. 26, 2022

(65) Prior Publication Data

US 2022/0233971 A1    Jul. 28, 2022

Related U.S. Application Data

(60) Provisional application No. 63/141,605, filed on Jan. 26, 2021.

(51) Int. Cl.
B01D 11/02 (2006.01)

(52) U.S. Cl.
CPC ........ B01D 11/028 (2013.01); B01D 11/0257 (2013.01)

(58) Field of Classification Search
CPC ............ B01D 11/0257; B01D 11/0269; B01D 11/028; B01D 11/0284
See application file for complete search history.

(56) References Cited

U.S. PATENT DOCUMENTS

2020/0054963 A1 *    2/2020  Buese ................ B01D 11/0284

FOREIGN PATENT DOCUMENTS

WO    WO-2018152528 A1 *  8/2018  ......... B01D 11/0207

* cited by examiner

*Primary Examiner* — Dirk R Bass
(74) *Attorney, Agent, or Firm* — SALIWANCHIK, LLOYD & EISENSCHENK

(57) ABSTRACT

A closed rotatable extraction system includes at least two tubes where one tube accepts an extractable material, and the system can be evacuated through a valve in the system. At least one conduit comprises at least one flexible hose, bent ridged pipe, t-pipe, curved pipe, or any combination thereof. At least one valve that when open allows evacuation of the system, and optionally for introduction of a solvent for extraction. When the at least one valve is closed a solvent vapor atmosphere is defined as almost exclusively or exclusively the solvent vapor and has a gas pressure that is about the solvents vapor pressure or less in the closed rotatable extraction system. The closed rotatable extraction system or a portion thereof can involve a first rotation orientation for liquid transfer and a second orientation for a vapor transfer.

8 Claims, 33 Drawing Sheets

*FIG. 8A*                 *FIG. 8B*

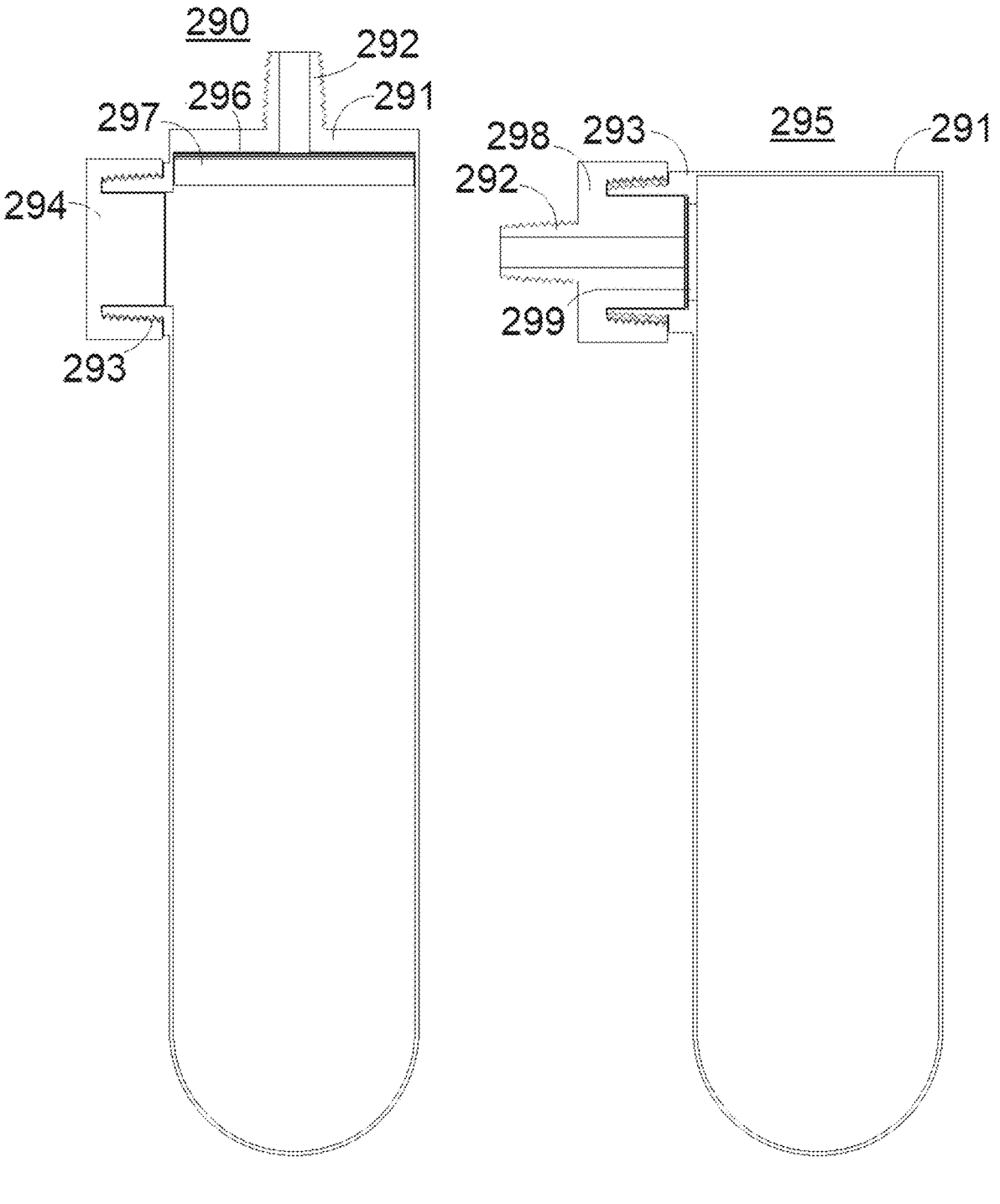
FIG. 8F                    FIG. 8G

CLOSED ROTATABLE EXTRACTOR SYSTEM

CROSS-REFERENCE TO A RELATED APPLICATION

This application claims the benefit of U.S. Provisional Application Ser. No. 63/141,605, filed Jan. 26, 2021, the disclosure of which is hereby incorporated by reference in its entirety, including all figures, tables, and drawings.

BACKGROUND OF THE INVENTION

The extraction process has been used for millennia for the removal of desirable materials from plants. The process involves the mixing of a solvent with plant material, separation of the formed solution, and, as desired, isolation of the dissolved solutes by the removal of the solvent. The ability to extract lesser amounts of material and retain and reuse all solvent is desirable. It is desirable to carry out extraction and separation of the extract solution at or near ambient temperatures in the absence of oxygen to retain the essence of the extract in its most natural state. Most extraction devices are not well suited for small scale production and permit a wide variety of low boiling and high boiling non-reactive solvents with processing at near ambient temperatures. An extraction device that can be used by an amateur extractor is desirable that provides extracts for personal needs with little water or power requirements and without mechanical devices for transfer of solvents, heating, and cooling.

For small scale, researchers often employ a Soxhlet extractor, which is an open system where extraction occurs at atmospheric pressure with most units limited to use of about a kilogram of extractable material or less. The solvent is a liquid at standard temperature and pressure (STP) and external heating and cooling sources promote transfer of solvent between the extraction thimble and a heated extract solution. Solvent recovery is a subsequent process to extraction and typically, but not necessarily, requires heating the solution. Soxhlet extractors typically constructed of glass, are fragile and costly to repair or replace.

Steam distillation is a process that employs high extraction temperatures, which imposes high energy costs for steam generation. Many natural products can react with the hot steam. Water or another cooling source used for condensation, imposes additional processing costs. The contacting with water requires subsequent product processing and water processing with accompanying costs. There are safety hazards related to steam generation.

The most practical method for the amateur is a contact extraction with a solvent followed by a filtration and a distillation of the solvent. In a typical laboratory, distillation is carried out using a rotary evaporator with the requirement of a cooled trap, to prevent the venting of solvent.

Hence, a system for extraction that retains a host of different solvent types quantitatively, is cost effective, energy efficient, and can permit an effectively safe operation near ambient conditions is desirable.

BRIEF SUMMARY OF THE INVENTION

Embodiment are directed to a closed rotatable extraction system that includes a plurality of tubes, where at least one tube has at least one cap or port for placement of extractable matter into the system. At least one conduit is between at least two tubes and the conduit can be at least one flexible hose, at least one bent ridged pipe, a t-pipe, or any combination thereof. The system includes at least one valve, through which the system can be evacuated and, optionally, solvent can be introduced or removed. When the valve is in a closed position, the system has a solvent vapor atmosphere primarily comprising the solvent in the system where the pressure is less than or about equal to the solvent's vapor pressure at a temperature within the closed rotatable extraction system. The conduit allows fluid transfer between at least two of the tubes, wherein at least one first tube initially contains extractable material and a second tube containing an extract. The entire closed rotatable extraction system or a portion thereof can exist in at least two orientations where one orientation allows liquid transfer, and another orientation allows vapor transfer while maintaining the solvent vapor atmosphere within the system. The vapor transfer is a distillation from the second tube containing extract solution to another tube within the system or to a solvent container outside of the system, where vapor passes out of the system through at least one valve in an open state and is connected to the solvent container such that the atmosphere remains the solvent vapor atmosphere during the distillation. The first tube can have a screen, filter, or combination thereof housed within or connected to the first tube. In embodiments, the system has a conduit that is a flexible hose or bent rotatable pipes for rotation of a portion of the system, which changes orientation of a portion of the system between an orientation for liquid flow and an orientation for vapor flow. In other embodiments the system is entirely ridged, and orientation changes are by orientation of the entire system. At least one valve in the system can be a quick-disconnect valve that can act as the rotatable element of the bent rotatable pipe comprising system. In this manner, two bent pipes oriented in an approximate S shape, or an approximate U shape allow liquid flow and vapor flow, respectively.

The closed rotatable extraction system's valves can be selected from quick-disconnect valves, ball valves, needle valves, plug valves, any combination thereof or any other valve where at least one can be closed to maintain the solvent vapor atmosphere throughout the extraction process as needed or only opened during operation to a solvent container under vacuum or having the solvent vapor atmosphere. The closed rotatable extraction system can be a two-tube system, a three-tube system, or can have any number of additional tubes where there is a redundancy of at least two tubes in systems with more than three tubes. Solvents that can be used are those that have a pressure below normal atmospheric pressure or pressures higher than normal atmospheric pressure, where, for the former, the system must accommodate elevated pressures and, for the latter, the system must accommodate vacuum. Vapor transfer requires at least a small pressure differential established between at least two tubes by cooling or heating one tube, or by cooling one tube and heating the other tube.

An embodiment is directed to a method of extraction, where a closed rotatable extraction system as described above involves steps of: placing an extractable material in at least one first tube; evacuating the system; transferring a solvent to the first tube by distillation or flowing from a solvent container not in the system or from a second or third tube in the system; soaking the extractable material in the first tube with the solvent to form an extract solution; aligning the closed rotatable extraction system into a first orientation for flowing the extract solution from the first tube into the second tube through the conduit to separate the extract solution from the extractable material and to collect the extraction solution in the second tube; aligning the closed rotatable extraction system into the second orientation for distilling the solvent from the extract solution in the second tube to produce an extract in a pure or highly concentrated state and condensing the liquid solvent in the first tube or a third tube, or a solvent container extra to the system through the valve where the solvent vapor atmosphere can be maintained throughout the transfer. The flowing of the extract solution from the presence of the extractable material can be by filtering through a filter within or attached to the first tube or by decanting the extract solution from the first tube.

During evacuation, the pressure can be reduced to 0.1 atmospheres or much lower as needed, such that little or no air is present during the extraction process, such that the atmosphere in the system is vapor of the solvent. This atmosphere allows vapor transfer from one tube to another by establishing a pressure differential by heating a tube from which solvent is to be removed, cooling a tube or container for receiving the solvent, or a combination of heating the delivery tube and cooling the receiving tube. The pressure in the system can be as low as about $1 \times 10^{-6}$ torr to about 500 psi depending upon the solvent.

Aligning the closed rotatable extraction system into the first orientation for liquid transfer involves elevating the first tube to an elevation greater than the elevation of the second tube and orienting the conduit between the first tube and the second tube for flowing of the extraction solvent from the first tube to the second tube. Aligning the closed rotatable extraction system into the second orientation involves orienting the conduit between the second tube and the first tube or the second tube and the solvent container in a manner that restricts liquid flow to the second tube during distillation.

BRIEF DESCRIPTION OF THE DRAWINGS

FIG. 8A shows a cross-sectional drawing of a tube secured with an externally threaded bung that is a portion of the tube and an internally threaded cap, according to an embodiment.

FIG. 8B shows a cross-sectional drawing of a tube secured with an internally threaded bung that is a portion of the tube and an externally threaded plug, according to an embodiment.

FIG. 8F shows a cross-sectional drawing of a tube sealed at both ends and a side port, according to an embodiment.

FIG. 8G shows a cross-sectional drawing of a sealed tube with a threaded side port with a complimentary threaded plug for all introduction or removal of matter, according to an embodiment.

FIG. 11C shows a schematic drawing of a three-tube rotatable extraction system with a third fixed 90° orientation of two tubes and a third tube for isolated extract, according to an embodiment.

DETAILED DESCRIPTION OF THE INVENTION

Figure 1A:
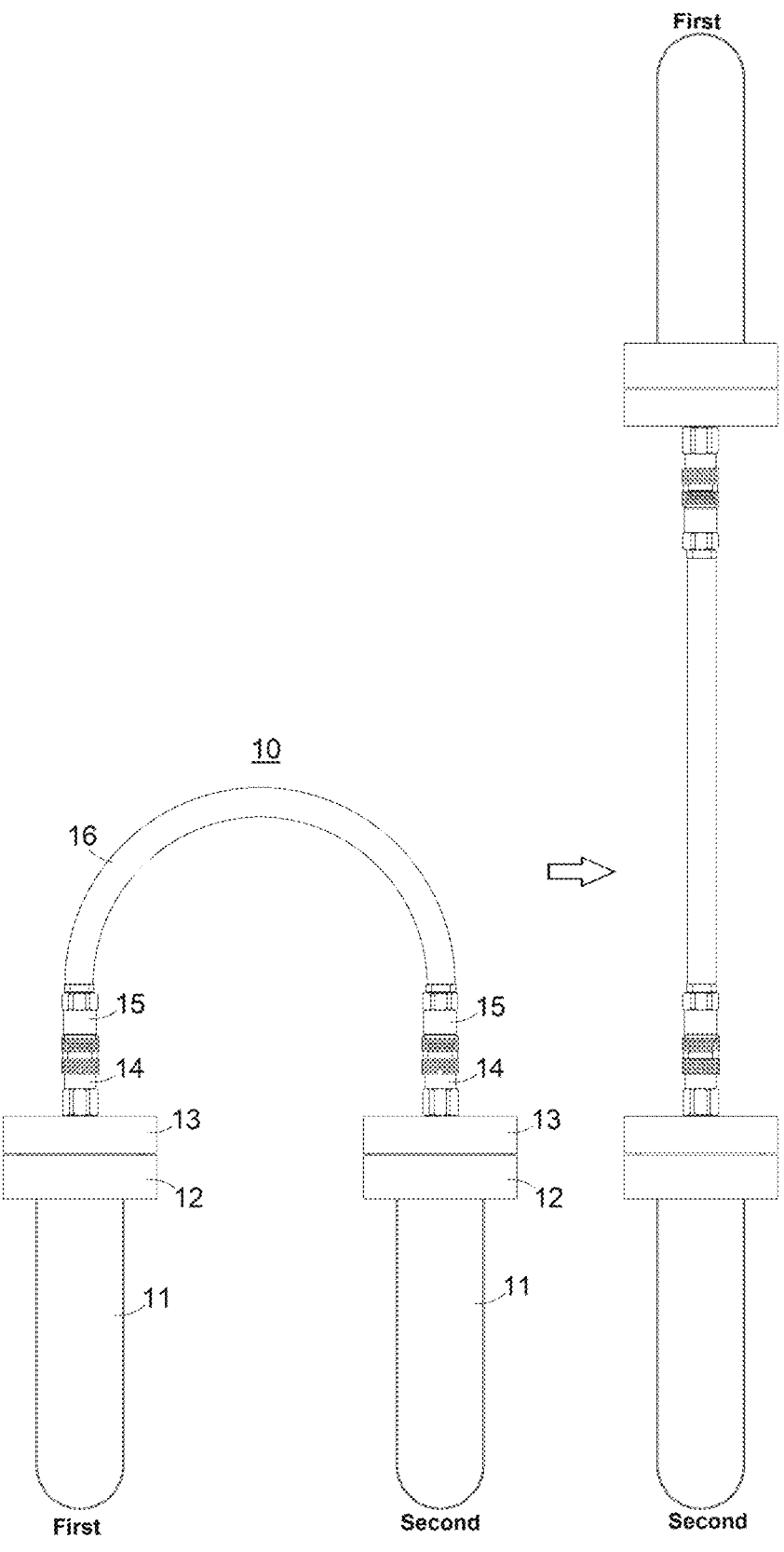
FIG. 1A shows a schematic drawing of a two-tube flexible extraction system in: a no flow or vapor flow orientation: and a liquid flow orientation, according to an embodiment.

In embodiments of the invention, an extraction system functions due to the gas atmosphere over the extraction solvent, extraction solution, and extractable matter being primarily the solvent vapor with little or no air or other gases. The extractor system comprises extraction chambers in the form of tubes or their functional equivalent that can be connected in a manner that allows flexing, rotating, of one tube relative to the other or performing the equivalent by rotating the entire system or connecting in one orientation, disconnecting, and reconnecting in a second orientation in a manner that the atmosphere being primarily, or exclusively, solvent vapor is maintained. The disconnecting and reconnecting are performed without exposure of the contents of the system to the ambient air atmosphere. The system allows steps for extraction, removing the extract solution from the extracted matter, and removal of the solvent from the extract solution without disturbing the solvent atmosphere within the system. The quality of the pump or other means to evacuate the system will depend upon the vapor pressure of the solvent in the system, whereas a solvent with lower vapor pressure requires a better evacuation system as the system works optimally when the solvent vapor provides the pressure defining gas in the system. In this manner, the transfer of solvent from the extract solution to liberate the extract can be done by promoting the condensation within one tube that is cooler than the tube from which the solvent is being removed from the extract. When the pressure in the system is exclusively from the solvent, little temperature differential is necessary and compensation for the heat lost by evaporation and/or the heat liberated upon condensation is maintains the gas transfer between the tubes.

Although all tubes and connections to the tubes may be identical, the tubes may differ in geometry, partitioning, and connectivity to perform exclusively as an extraction chamber or exclusively for recovery of extract. An additional tube may be included to facilitate isolation of the extract in a container. At least one tube has a cap or port to allow the inclusion of extractable matter and removal of the spent matters, or to remove an isolated extract from a tube. The extract that can be removed can contain some solvent or be free of solvent, even in the low parts per billion upon removal from the system, with the quantity of residual solvent depending upon the solvent used. The connections to the tube or the cap or bung can include a filter element, which can be within, adjacent to, or proximal to a conduit leading from the tube. Alternatively, the extractable matter can be contained within a filter bag, which can be flexible or ridged, where the insertion of the extractable matter can be before or after the filter bag is placed in the tube for extraction. A filter can be connected to the tube at a site other than the cap or port. The system includes at least one valve, such that the air can be removed, and solvent can be placed within the system to a desired level, which is a level up to that which fills the tube to which extractable matter has been placed. Closure of a valve enables the retention of the solvent atmosphere within the extraction system.

The conduit from one tube to the other can be a flexible tube or can be bent ridged pipes where a rotatable section connects the pipes or a pair of tubes. In these embodiments, the two orientations of the tubes for liquid and gas transfer are accessible by flexing or performing a rotation to achieve an equivalent orientation. The tubes can be quasi-rotational or quasi-flexible, where at least one ridged conduit can be readily connected and disconnected without loss of the solvent atmosphere to allow the two orientations of the tubes that facilitate liquid and gas transfers. The tubes can be fixed in a geometry that allows the entire extractor system to be reoriented by its rotation or inversion to achieve the different orientations required for liquid transfer and gas transfer. In embodiments, the extraction system can include a combination of hoses and rotatable tubes.

The tubes need not be cylindrical in shape, but may be spherical, cubical, or any other shape that can house a desired amount of an extractable material and solvent. The shape and size of the tubes can be the same or different. For example, the tube that includes the extractable matter can be of a larger size than the tube that receives the extract solution separated from the extractable matter. In an embodiment, the tubes are closed at a first end during use and the first end may be a permanently closed-end tube or a tube portion fitted with a valve, a port, or a removable cap such that fluid is not transferred through this end during the extraction, extract solution transfer, or extract solvent transfer yet allow access to load or remove an extractable matter, spent matter, extract, or an extract solution from the tube. In an embodiment, the system may include a tube that does not have a mode of opening the tube to the atmosphere other than through a conduit through which fluid can be transferred into or out of the tube. At the second end of the tube, a connection to a conduit is required for the transfer of fluids during the extraction process. In embodiments, the valve may be in or attached to at least one portion of the conduit for fluid flow. The valve may be within the fluid flow path or outside of the fluid flow path. The valve(s) may be a single valve, a pair of complimentary valves, or a series of redundant valves that are chosen for performing the manipulations of the tubes positions in optimal fashion, while assuring the maintenance of the desired solvent atmosphere within the system. A valve, which in embodiments can be the only valve of the system, may terminate the extraction system, where, when closed, one side of the valve is in contact with the solvent atmosphere, but the other side is not necessarily in contact with the solvent atmosphere.

In embodiments, situated at one or more portions of the flexible hose or in the rotatable angled ridged pipe is one or more quick-disconnect valves, a "quick disconnect." The quick disconnect can be substituted by other valves or in combination of valves, for example, but not limited to, a ball valve connected to a quick-disconnect valve. Valves that can be used in addition or alternatively to the quick-connect are ball valves, plug valves, needle valve, or any other valve capable of use under vacuum or pressure. The quick-disconnect may comprise a male or female connection to connect complementary matched quick-connects where both quick-connects contain a check valve, comprise a pair of connects that form a butterfly like matched discs coupling, or coupled by any means where two tubes can be connected without the introduction of air or other fluid or loss of the desired solvent atmosphere during coupling, flexing, or rotating of the flexible extractor system. Rotation can be performed by disconnection and reconnection or carried out while connected as dictated by the structure of the quick-disconnect. Quick-disconnects can be but are not limited to flat face; ball face; or any other type of coupling that allows the rapid and effectively leak free connection and disconnection by insertion with a push to connect or thread to connect mechanism. The quick-disconnect valve can restrict rotation around the valve or can allow rotation about the valve such that at least 180-degree rotation of the valve is possible such that disconnection and reconnection is not required to reposition the tubes relative to each other. The quick-disconnect valve can be connected in at least two orientations, where an effective 180-degrees orientation of the tubes can be established by the two ridged angled pipes connecting the tubes. A flexible hose can be fully replaced with ridged conduits, or the extraction system employs a flexible tube that is augmented with a rotating angled ridged connection.

In embodiments, at least one screen, filter, or combination thereof is included in the system. The screen or filter can be supported in a portion of the system to retain solids in a portion of the system, for example, retaining a plant material or other extractable material in a tube. The filter can be at the exit of the tube in a cap or within the conduit connected to the tube. The filter can be a paper filter, a plastic filter, a glass filter, a metal filter, a metal screen, or any combination thereof. The filter can be a paper or plastic filter sandwiched between metal screens and sealed with gaskets. The filter can be in the form of a bag, cup, or other shape that can isolate the extractable matter from flow throughout the conduit between tubes. The porosity can vary depending upon the nature of the extractable material employed, as a finely ground material requires a finer filter than does, for example, freshly cut plant matter. One of skill in the art can determine the proper porosity with little experimentation or one may use a sufficiently fine filter that would be appropriate for any material, although the porosity of the filter can reduce the rate of fluid flow in the system and diminish the rate at which the process can be carried out.

In an embodiment, a pressure relief valve can be included in one or more tubes, or can be in a bung, cap, or conduit such that the solvent gas can escape if the pressure exceeds a safe limit for the system. Although solvents that have vapor pressures below ambient pressure at ambient or slightly elevated temperatures can function safely without a pressure relief, those that are gases at ambient temperatures and pressure are most safely used with a pressure relief. As a typical extraction is not a process that typically generates significant heat, often the temperature of the system can be controlled to lessen the necessity of the pressure relief. The pressure relief valve should be matched to the solvent for which the operator intends to employ. For example, the pressure relief valve can be one like those internal and external valves employed with a propane cylinder if a desired solvent is propane. The system can be constructed of components that can withstand any pressures anticipated for a variety of solvents under normal use.

In some embodiments, the closed extraction system has one or more flexible hoses are conduits between tubes. In an embodiment, as shown in FIG. 1A, a flexible extraction system (10) includes two tubes (11), each attached via a bung (12) with a securable cap (13) that is fixed to a male valve (14) of a quick-disconnect. Throughout this disclosure, numbers are not shown on the equivalent parts on other portions of the drawing, or in a subsequent drawing that includes the extraction system, other orientations used in the method of use of the extraction system or employed with holders or baths, as these components' number are clear from the numbers elsewhere in the figure or referenced figure. Tubes 11 need not be of equal size and a single tube can be replace and connected as a plurality of tubes as desired. A flexible hose (16) has two ends with each end fixed to a complementary female valve (15) of the quick-disconnect. Although shown with male valve 14 and female valve 15, the opposite mode of coupling is equivalent for the extraction process. The system employs one or more means for evacuating, filling with a solvent, as a gas or as a liquid, and removing the solvent as a gas, where the means can be connected to the female valve 15 or the male valve 14 of the quick-disconnect.

The system can be used for carrying out the extraction of a plant material or other extractable material using the two tubes where the plant material is placed in a first tubes and the tube is sealed after evacuation. Solvent can be added directly to the first tube or can be introduced or otherwise contained in the second tube and can then be transferred to the first tube from the second tube by distilling the solvent onto the plant material in the left orientation shown in FIG. 1A, or the second tube can be raised above the first tube and the liquid solvent drained from the second tube into the first tube with the plant matter, opposite the relative positions of the first and second tubes shown in the right orientation of FIG. 1A. FIG. 1A illustrates an orientation to drain the extract solution from the extracted plant matter to the second tube from which extract is ultimately isolated. When the solvent has a higher boiling point than ambient temperature, the solvent can be placed into a tube, either with or without the plant material. The solvent or combined solvent and plant material can be chilled to freeze the liquid and the system or portion of the system containing liquid is evacuated, where upon a sequence of one or more freezing and thawing sequences, effectively all dissolved air can be removed from the system. Alternatively, after evacuating the system, the solvent can be distilled into the system.

By emersion of the plant material within the solvent, the extract dissolves into the solvent to form an extract solution. Depending on the plant material, solvent, their proportions, the temperature of the extraction, the optimal time for holding the plant material in the solvent will vary, where the achievement of the partition equilibrium of the compounds extracted into the solvent may be desirable or some pre-equilibrium mixture may be selected that optimizes a rate of throughput. The extract solution can be decanted from the plant material, or the solution can be filtered from the extracted plant material with the inclusion of a screen or other filter in the bung 12, cap 13, or between the combination of bung and cap 12, 13, by raising the first tube, in an effective mode, for example, but not necessarily, from more than 90 to about 180-degrees above the second tube. As illustrated, the male valve 14 is at or near the center of the cap 13 but can be attached near a side o through a side of the cap 13. The solvent can be distilled from the extract solution in the second tube back to the first tube containing partially or fully extracted plant material or distilled to an evacuated third tube, equivalently fixed to a bung and cap and first portion of a quick-disconnect, or to an alternative solvent reservoir, for example, but not necessarily a third tube 11, that can be connected without loss of the solvent atmosphere. The solvent can be stored in the third tube and used as the second tube in a subsequent extraction process, allowing any step for introducing the solvent to the system to be effectively completed before placement of plant matter and evacuation of the first tube is performed.

When additional soakings with the solvent is needed to remove all or most of the extract from within or on the plant material, the solvent can be distilled from the extract solution in the second tube to the first tube with partially extracted plant material so that partially extracted plant material is further extracted, and the solution decanted or filtered back to the extract in the second tube, where this process of solution drainage and solvent distillation to the plant matter can be repeated to ultimately achieve a more complete extract from the extractable material. As subsequent extractions yield less extract than the previous extraction, each subsequent extraction becomes lesser in desirability. If during a first extraction of a given mass of plant matter with a given mass of solvent, by determining the amount of extract from a first extraction, and then determining the amount of extract from a second extraction, an operator can make a reasonable estimate of the amount of extractable in the virgin plant material and the partition coefficient for the extraction. Any subsequent repetition of extraction can be designed using these values. This process can be repeated until the operator terminates the series of distillation and decantation or filtration when a desired extent of extraction of the plant material is achieved. Generally, but not necessarily, a second extraction is useful for removing extract that is wetting the plant matter after a first drainage of the extract solution from the first tube to the second tube. The extract solution that is held on the plant matter can hold up as much as about one to about ten percent, or more of the extract, depending upon the plant matter, solvent, and the operator's technical soundness. Ultimately, the solvent is distilled from the second tube 11 to isolate the extract.

Distillation and/or filtration can be promoted by cooling the tube 11 receiving the liquid or gas and/or heating the tube 11 delivering the liquid or gas. The temperature differential imposes a pressure differential that aids in fluid flow. For example, distillation of the solvent from the first extract solution in the second tube 11 to the partially extracted plant material in the first tube 11 can be promoted by cooling the first tube 11 in an ice-water bath while warming the second tube 11 with a warm water bath.

Figure 1B:
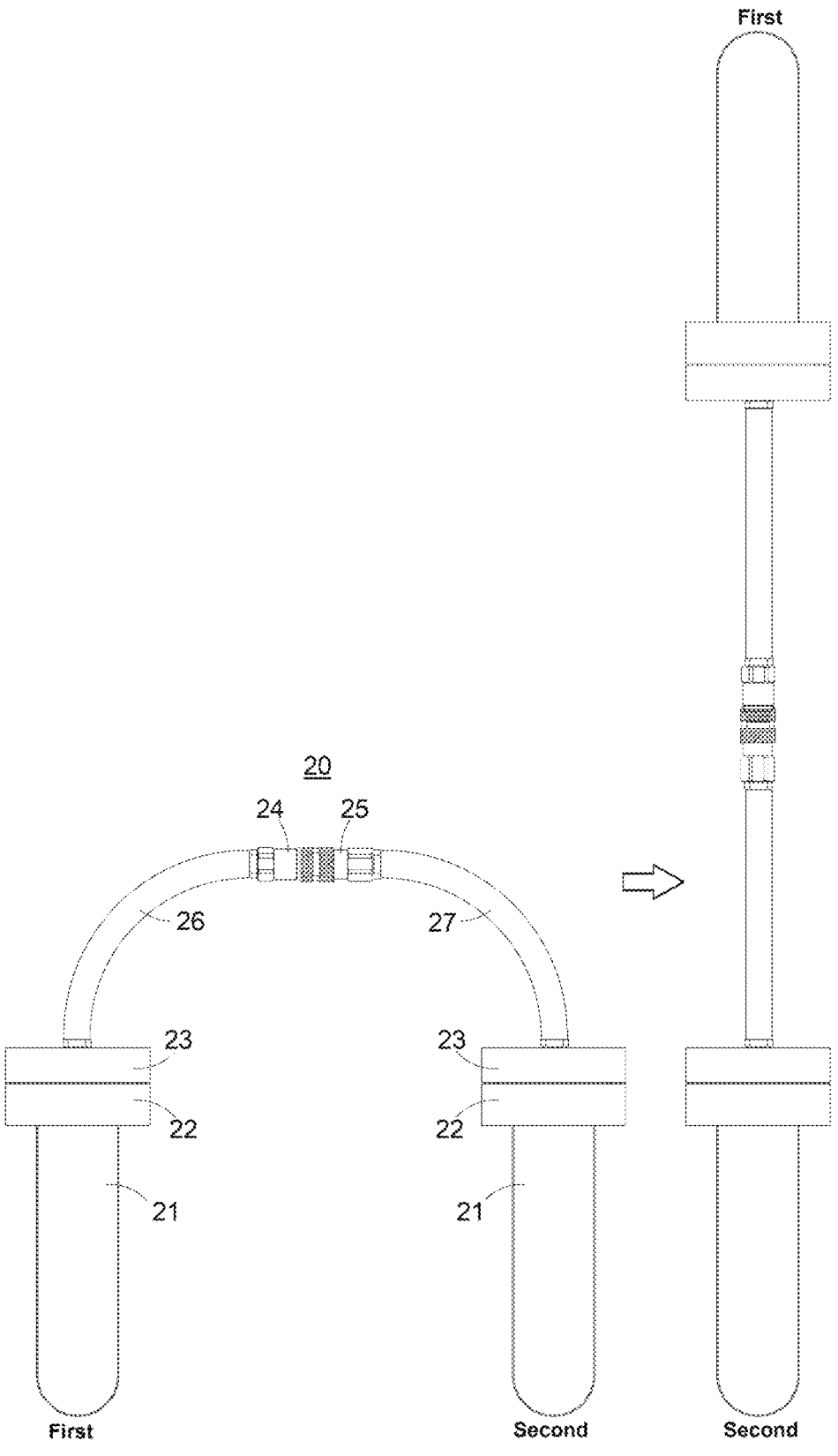
FIG. 1B shows a schematic drawing of a two-tube flexible extraction system in: a no flow or vapor flow orientation: and a liquid flow orientation, according to an embodiment.

In another embodiment, as illustrated in FIG. 1B, a flexible extraction system (20) includes two tubes (21), each attached via a bung (22) with a securable cap (23) that is fixed to a proximal end of a hose (26) or (27) and each is fixed to a male or a complementary female valve (24) or (25) respectively of a quick-disconnect. The system can employ one or more connectors for evacuating, filling with a solvent, as a gas or as a liquid, and removing the solvent as a gas.

Figure 1C:
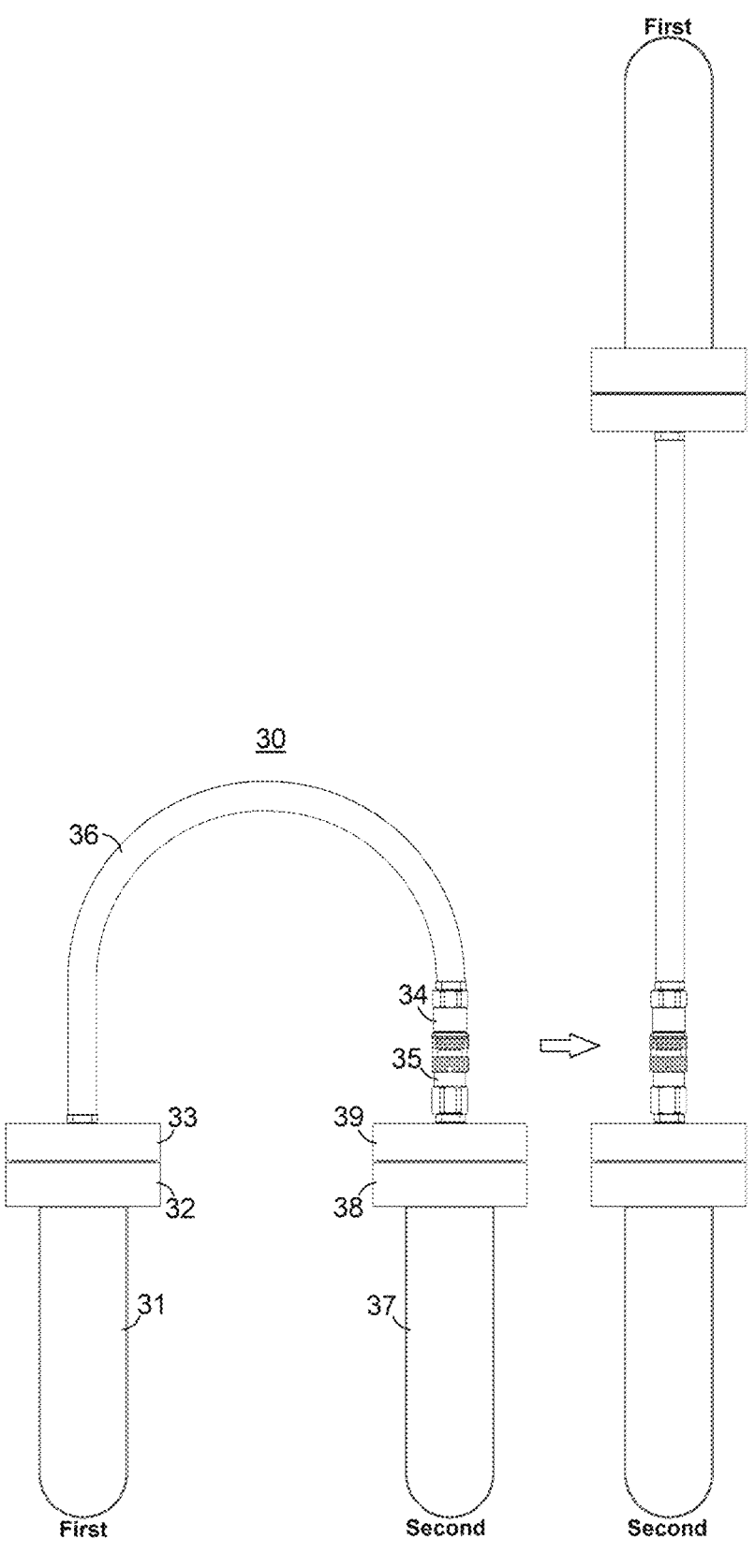
FIG. 1C shows a schematic drawing of a two-tube flexible extraction system in: a no flow or vapor flow orientation; and a liquid flow orientation, according to an embodiment.

FIG. 1C shows a flexible extraction system (30) includes two tubes (31) and (37) where a first tube's 31 bung (32) and securable cap (33) is directly connected to a flexible hose (36) of the system that attaches to the first tube's cap 33 distal end to the first portion of the quick-disconnect (34). The second tube's 37 bung (38) and securable cap (39) is directly connected to the complementary portion of the quick-disconnect (35). As illustrated, with the plant material in tube 31, the extract solution and ultimately the extract is collected in tube 37. If a third tube is employed, it can be equivalent to tube 37, where a final transfer of solvent from the spent plant matter in the first tube is by distillation. Such a third tube 37 can facilitate storage of the extraction solvent for use in a subsequent extraction process.

Figure 1D:
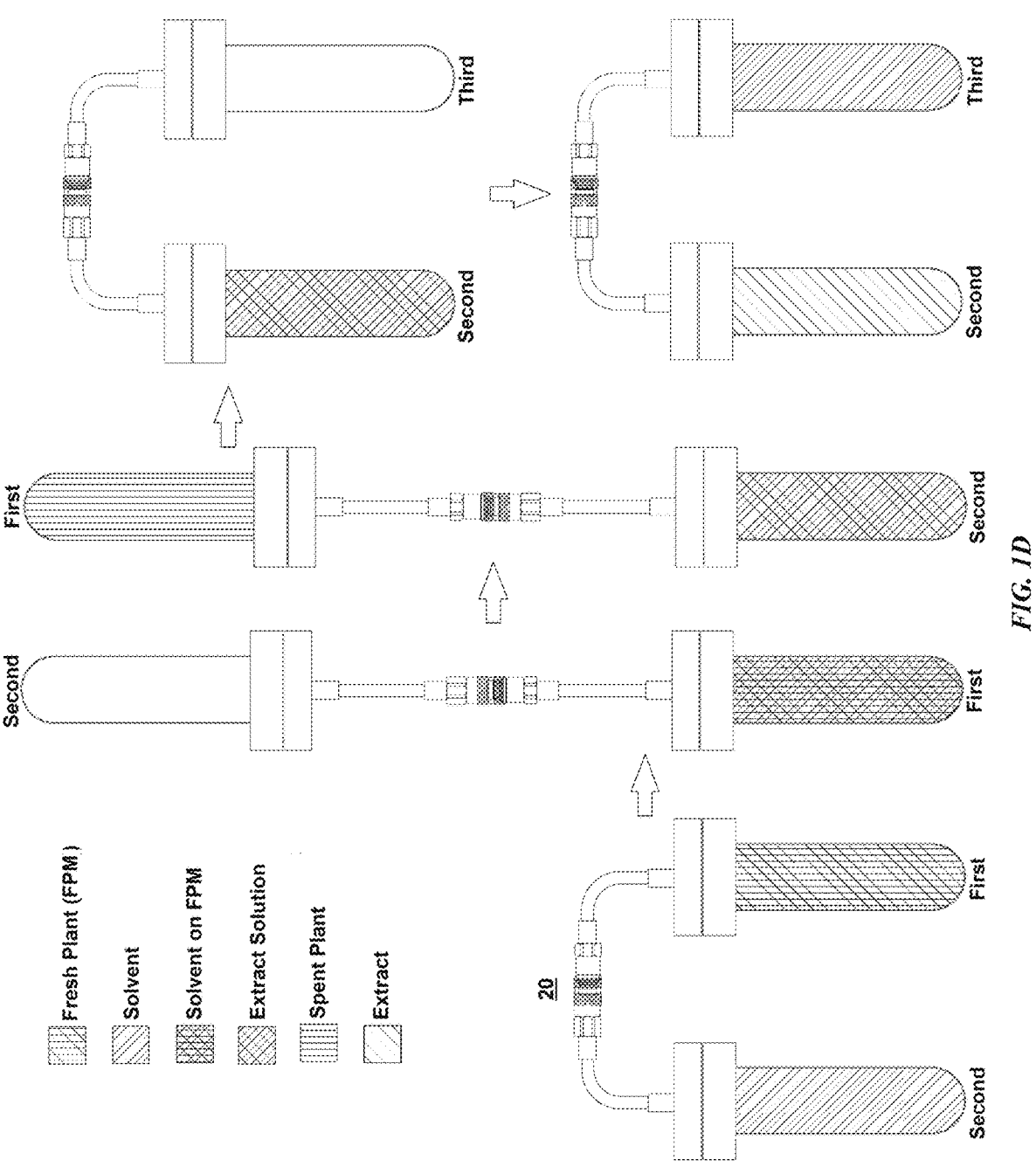
FIG. 1D shows a schematic drawing of a process using a three tube flexible extraction system employing the components of FIG. 1C with a redundancy of the portion having a male disconnect where: two complementary tubes are selected with one containing fresh plant material (FPM) and one with solvent; a liquid flow orientation is established to add solvent onto the FPM, inversion to separate the extract solution from the spent plant material; connecting the third tube to the tube containing the extract solution; placing in a vapor flow orientation and distilling solvent from the extract; and separating the tubes containing extract, solvent, and spent plant material, according to an embodiment.

FIG. 1D illustrates steps of a process, according to an embodiment, to employ the flexible extraction system 20 of FIG. 1B employing a third tube structurally equivalent to the first tube, where the third tube has a hose that is connected to the male valve quick-connect for the final collection of the solvent. By a sequence of: Step 1—connecting a second tube having fresh plant material (FPM) and a male valve quick-disconnect to a complementary first tube with a female valve quick-disconnect that contains solvent; Step 2 orientating the tubes for a transfer of liquid solvent from the second tube to the first tube containing FPM; Step 3 inverting the entire system for transfer of extract solution from the first tube to the second tube; Step 4—disconnection the first and second tubes and connecting the third tube; and Step 5 orientating the second and third tubes for distilling solvent from second tube to the third tube where the third tube contains solvent and the second tube has the desired extract. The time between Steps 2 and 3 will depend upon the time required for partitioning the extractable compounds on or within the fresh plant material into the solvent. This period of time will depend upon the nature of the plant material, including the surface area and plant particle size; the nature of the solvent; the relative proportions of plant material and solvent; the temperature in the mixture during partitioning; and any manner of agitation of the suspension of plant material in the solvent that might be imposed. One of skill in the art of extraction can readily determine the time required for achieving a desired extract and quantity of extract by routine experimentation.

Step 3 leaves a film of extract solution on the interior walls of the system and plant matter, additionally all extract may not have partitioned into the solvent. Inclusion of an additional steps between Steps 3 and 4 can be inserted where solvent is distilled from the extract solution in the second tube back to the extracted plant material in the first tube, in the manner shown for Step 5, followed by a repeat of step 3, can be carried out one or more times to collect additional extractable compounds from the plant material into the extraction solution before final removal of solvent in steps 4 and 5. To simply remove extract solution or extract wetting the surfaces of the plant material and walls of the tubes and conduits, an orientation for liquid transfer can be made and a cooling means applied to the surface of the first tube, conduits, and/or portions of the second tubes, which can be holding a cold pack, such as an ice pack or other equivalent means to the external surfaces, for washing the internal surfaces and consolidating extract in the bottom of the second tube.

As shown in FIG. 1D, with two sets of complementary tube portions, the third tube employed in the first process can be used as the solvent reservoir and subsequently used as the solvent containing second tube at step 1 of a subsequent extraction process. The second tube containing extract of the first process can be emptied of the first extract or used in a modified second process, where it is connected as a first tube with FPM and the first extract are combined. The modified process allows extract from one or more previous process runs to be combined in the extraction process and can be a preferred method when the amount of extract in the plant matter is small, such that losses during extract isolation are minimized relative to isolation in every run.

Figure 2:
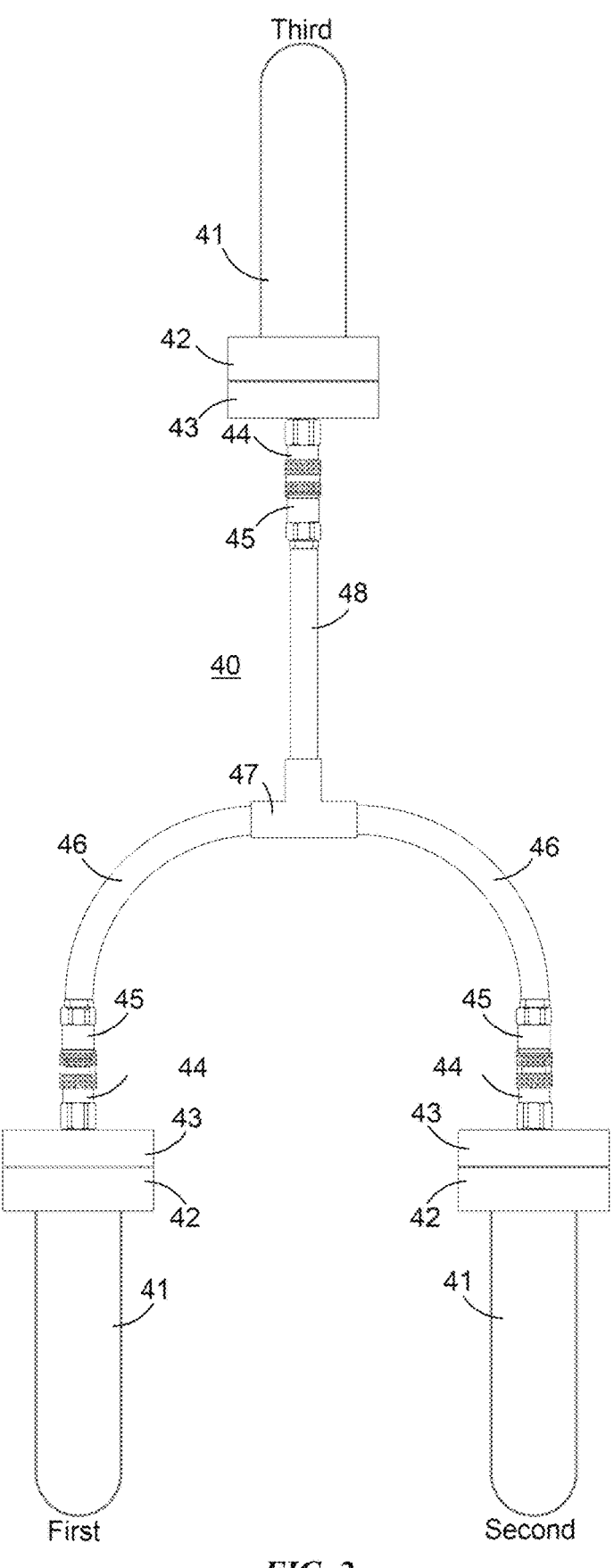
FIG. 2 shows a schematic drawing of a three-tube flexible extraction system, according to an embodiment.

In an embodiment, as illustrated in FIG. 2, the flexible extraction system (40) includes a t-connector (47) that attaches three hoses (46) and (48) to three tubes (41), indicated in FIG. 2 as a first, second, and third, each attached via a bung (42) with a securable cap (43) that is fixed to a male valve (44) of a quick-disconnect and a complementary female valve (45) of the quick-disconnect. In this manner the delivering tube during transfer of fluid is not necessarily a true 180-degree orientation to the destination tube when the central hose is on the t-connector 47, but effectively allows a liquid delivering tube 41 to be oriented above the destination tube 41 with the third tube 41 oriented to avoid liquid flow into the third tube 41. The non-used tube 41 may remain connected or be disconnected during transfers in which it is not involved. A three-way connector is shown in FIG. 2 as a tee 47 with two parallel ends and one perpendicular end; however, other orientations, such as a tee where the ends are oriented 120-degrees, or any other orientation of the tee, can be used. Although FIG. 2 illustrates the position of the quick-disconnects in a manner equivalent to that of FIG. 1A, the quick-disconnects can be situated at the t-connector 47 or where any of the hoses 46 and 48 are partitioned into two hose portions; where a first portion is connected to the securable cap 43 and a portion of the quick-disconnect, either 44 or 45, and a second portion connected to the t-connector 47 and the complementary portion of the quick-disconnect, 45 or 44, respectively.

Alternatively, one hose, for example, but not necessarily, hose 48 can be replaced with a ridged tube or pipe that can be straight, as illustrated, or possess a bend, for example, but not necessarily, a 90-degree bend. A modified system of FIG. 2 can have only one or two quick-disconnects, rather than three are present, as a single valve allows the required evacuation and an optionally solvent input and output to the system.

Figure 3A:
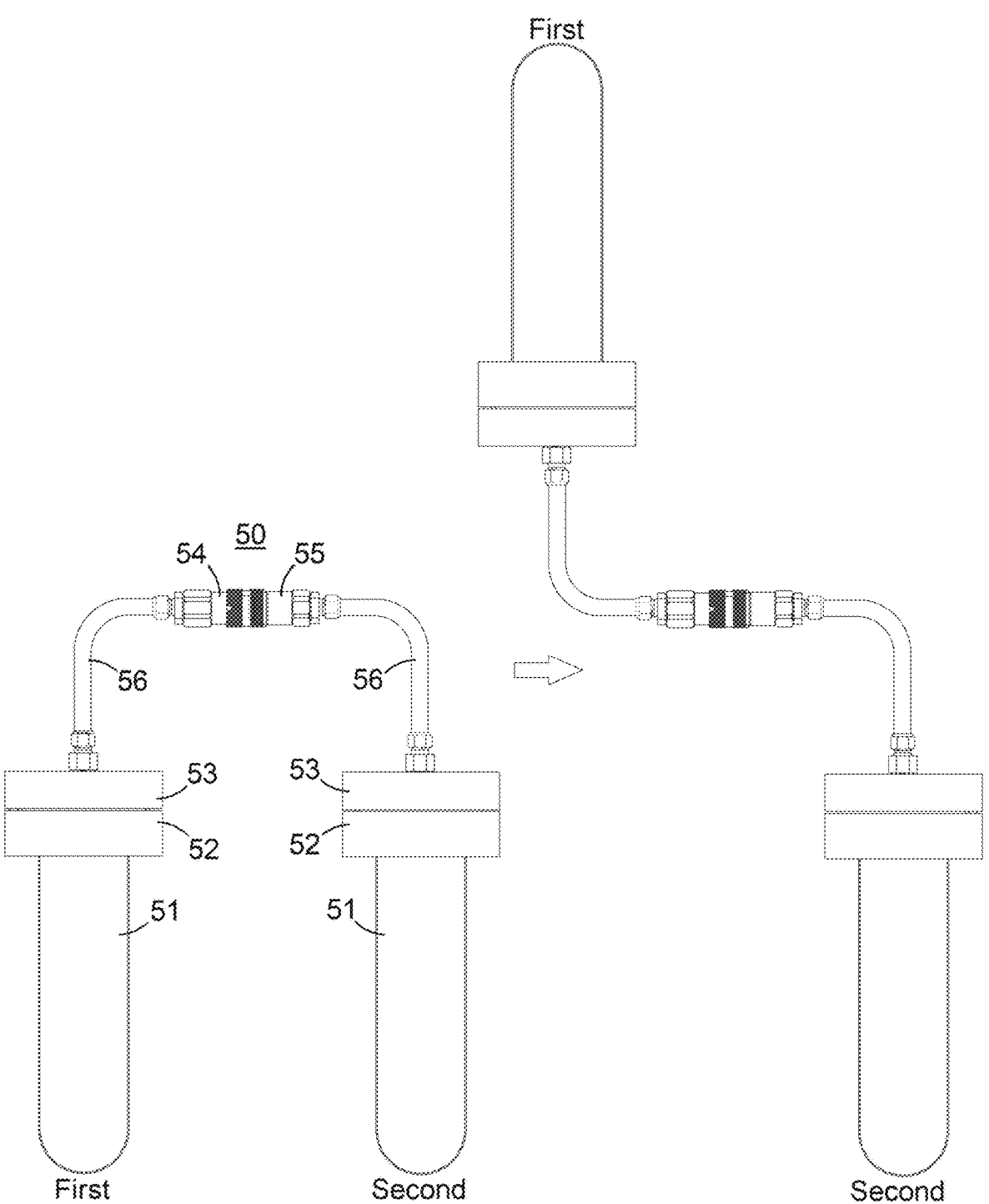
FIG. 3A shows a schematic drawing of a two 90-degree bend tubes rotatable extraction system in: a no flow or vapor flow orientation; and a liquid flow orientation, according to an embodiment.
Figure 3B:
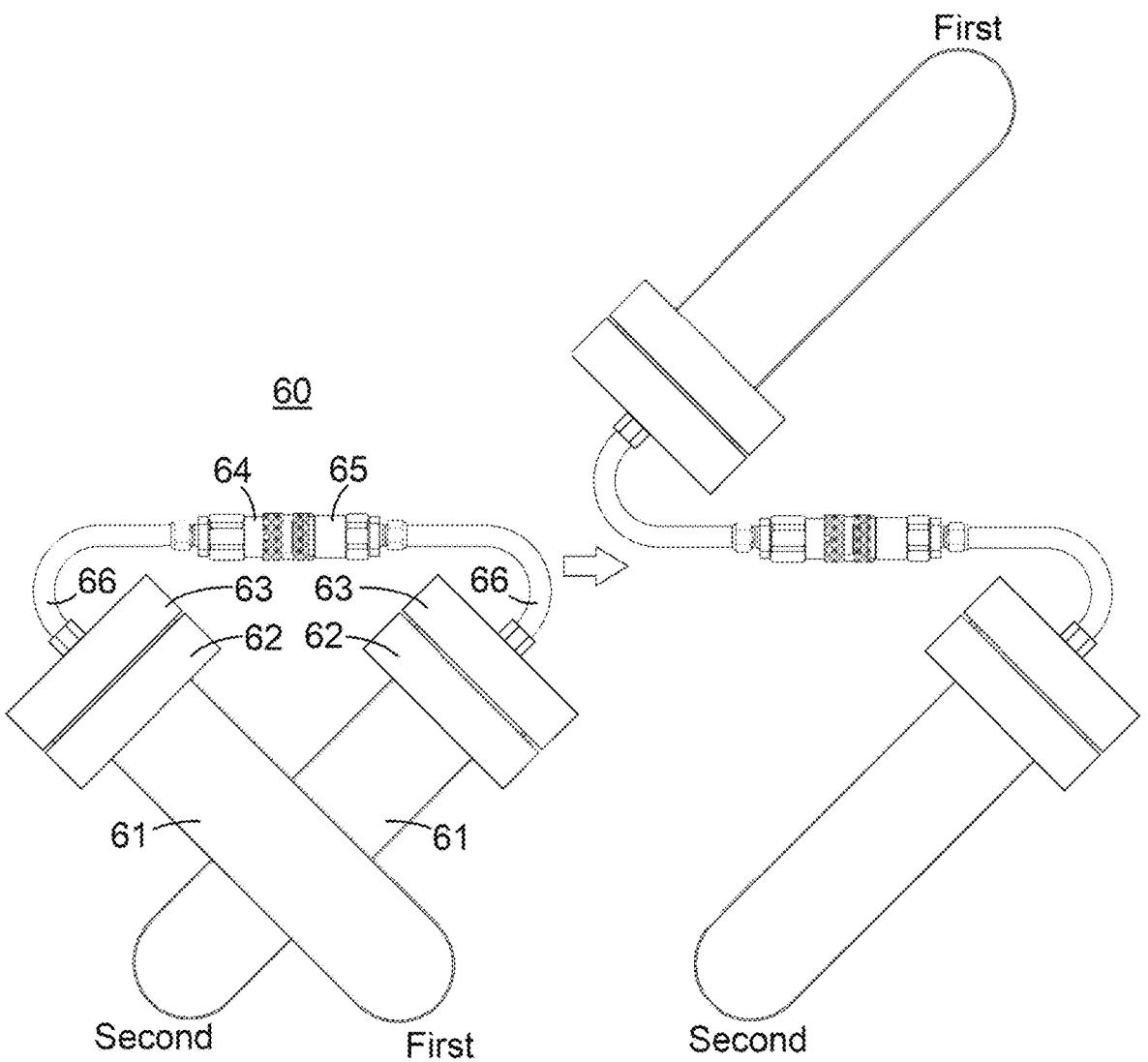
FIG. 3B shows a schematic drawing of a two 45-degree bend tubes rotatable extraction system in: a no flow or vapor flow orientation; and a liquid flow orientation, according to an embodiment.
Figure 3C:
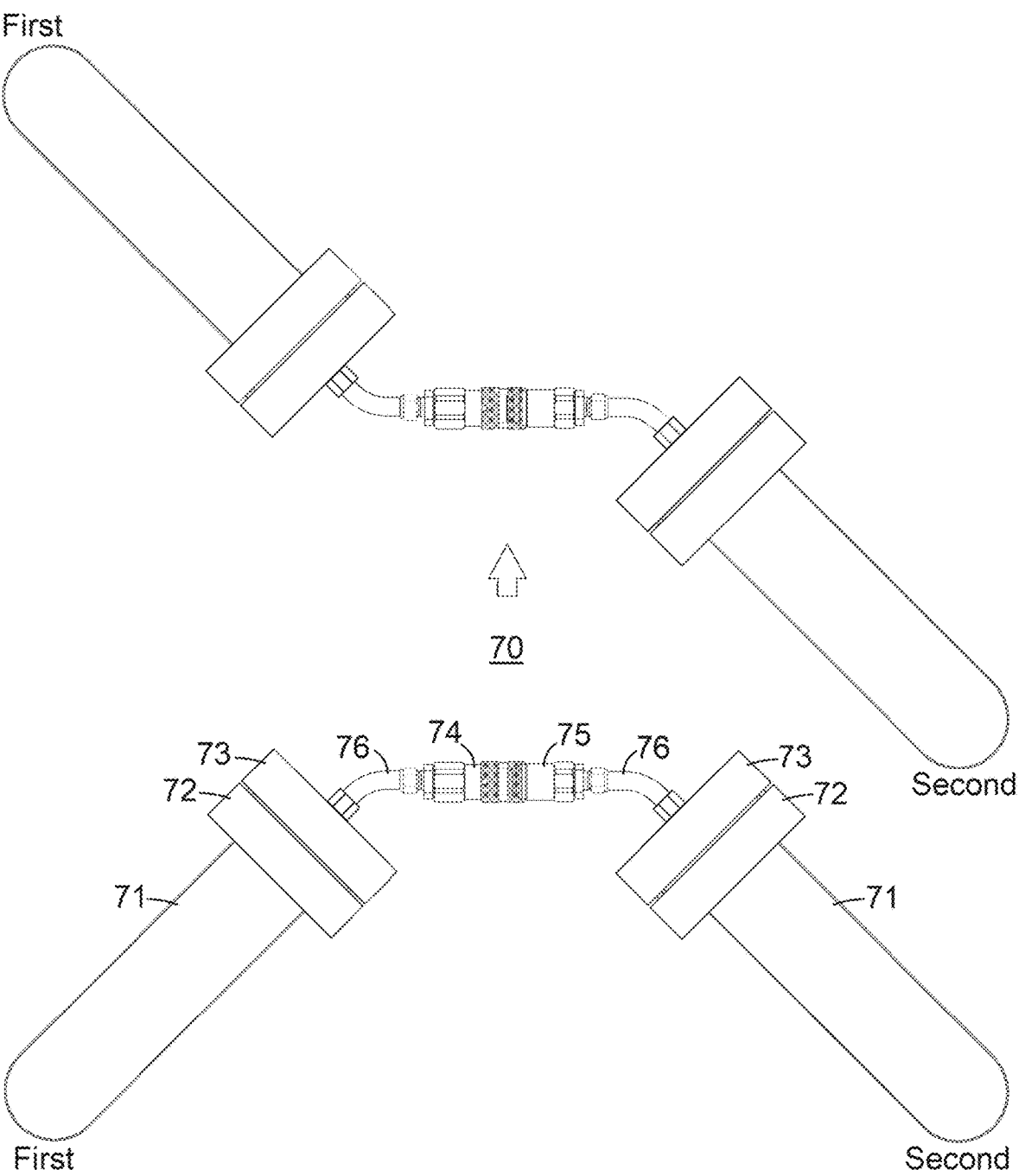
FIG. 3C shows a schematic drawing of a two 135-degree bend tubes rotatable extraction system in: a no flow or vapor flow orientation; and a liquid flow orientation, according to an embodiment.
Figure 3D:
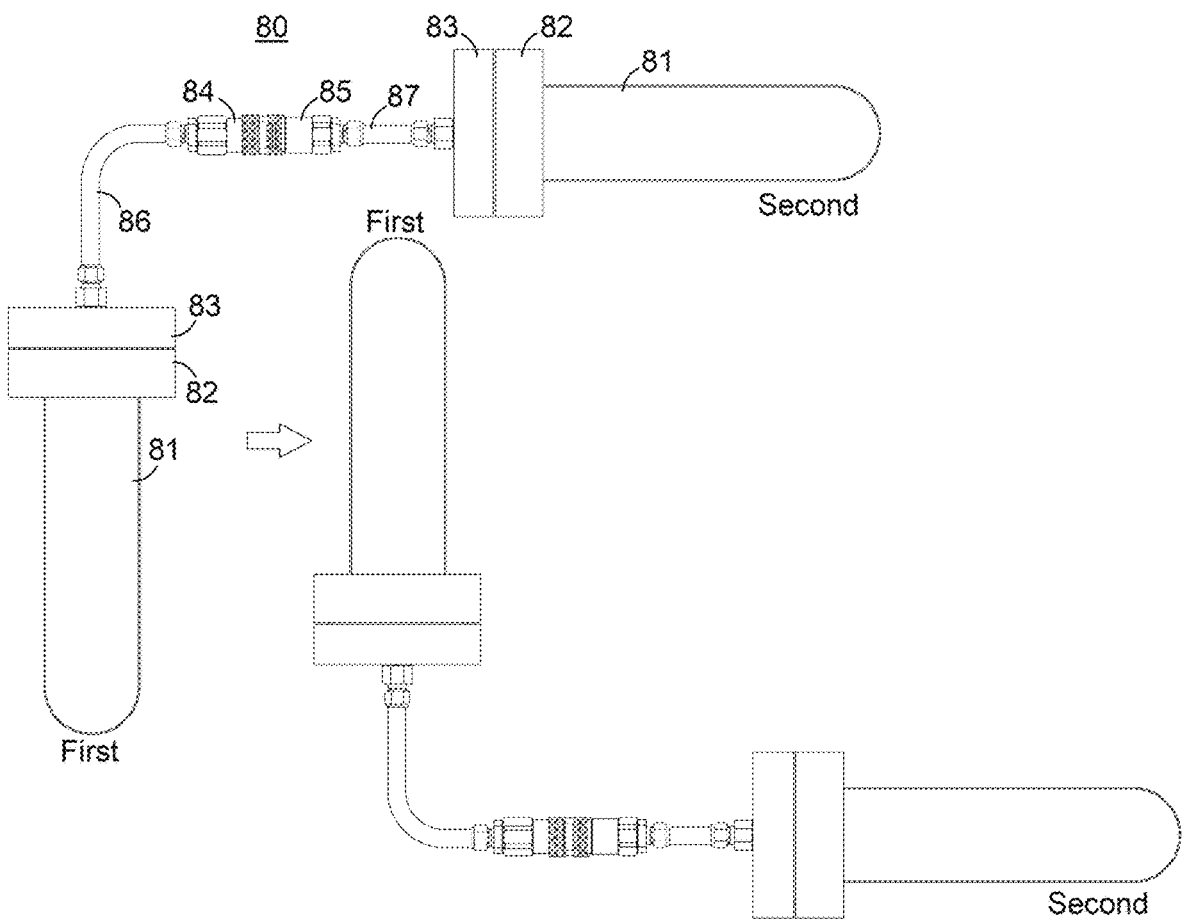
FIG. 3D shows a schematic drawing of a one 90-degree bend tube and a straight tube rotatable extraction system in: a no flow or vapor flow orientation; and a liquid flow orientation, according to an embodiment.

In other embodiments, the flexible extraction system, as illustrated in FIG. 1A, has the flexible hoses replaced with ridged pipes (56) with two 90-degree bend, as illustrated in FIG. 3A to form an internally rotatable extraction system (50). There is no requirement of an equal bend, only that the angled pipes permit an orientation of the tubes (51) that does not allow a liquid fluid from a filled tube to necessarily spilling into another tube 51 when liquid fluid transfer is not desired. Hence the angle of the bends may be less than 90 degrees, as illustrated in FIG. 3B or greater than 90 degrees, as illustrated in FIG. 3C, for example any angle from about 10 to about 170 degrees such that liquid transfer can be inhibited or actuated by rotation of the pipes relative to each other or rotation of the entire extraction system. The internally rotatable extraction systems, 50 60 or 70 have two tubes 51, (61), or (71), each attached via a bung (52), (62), or (72), with a securable cap (53), (63), or (73), that is fixed to a proximal end of a rigid pipe 56, (66), or (76), and fixed to a first or the complementary second portion (54), (64), or (74), or (55), (65), or (75), of a quick-disconnect, respectively. The illustrated quick-disconnect 54 55 allows rotation, although the change in orientation does not require rotation but can be completed by disconnecting and reconnecting to result in a transfer effective 180-degree reorientation of the tubes 51, which is one that allows a liquid flow in a controlled manner. As illustrated in FIG. 3D, the rotatable extraction system 80 includes two pipes 86 and (87) but only one 86 requires a bend, where optional tube 87 is effectively straight. Internal rotation of the tubes about the quick-disconnect 84 85 is not required as an external rotation of the entire extraction system achieves the two orientations, and the quick-connect 84 85 can be exclusively used for evacuation and fluid flow into the extraction system.

Figure 4A:
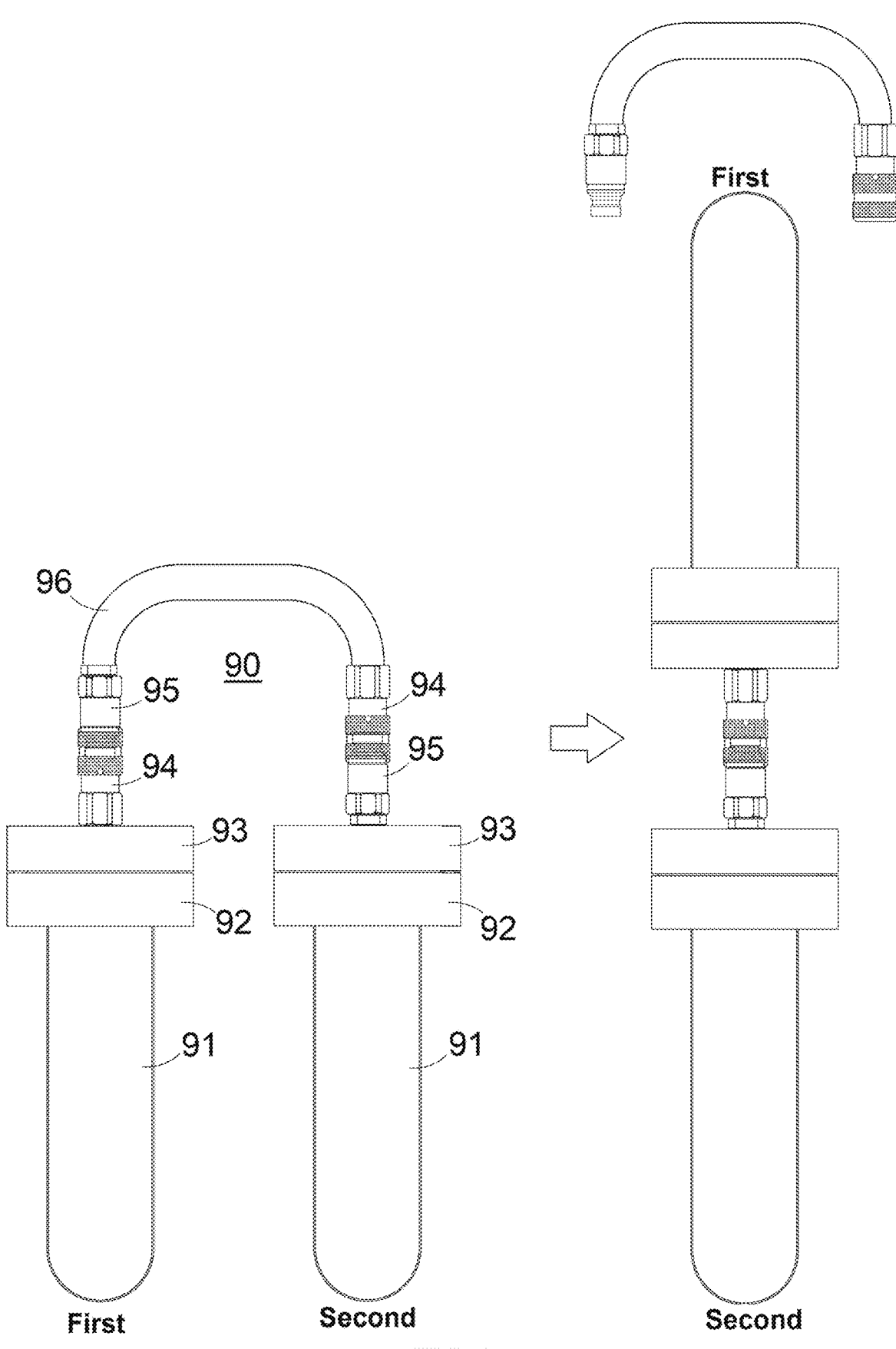
FIG. 4A shows a schematic drawing of a two 90-degree bend fixed tube for a quasi-rotatable extraction system in: a no flow or vapor flow orientation; and a liquid flow orientation, according to an embodiment.

The use of ridged bent pipes does not require that individual pipes be directly attached to the securable cap. As shown in FIG. 4A, a non-flexible extraction system (90) includes two tubes (91), each attached via a bung (92) with a securable cap (93). The first securing cap 93 is fixed to a male valve quick-connect (94), where a second securing cap 93 is connected to a female valve quick-disconnect (95). The two complimentary tubes 91 connected by directly coupling their complimentary portions of the quick disconnects 94 and 95 allows liquid solvent flow from one tube 91 to the other tube 91, as indicated in the stacked orientation illustrated in FIG. 4A. A curved ridged pipe (96), for example, but not limited to, two 90° or a single 180° curvature to two ends, allows attachment to a complimentary portion of the quick-disconnects 94 and 95. The ridged pipe 96 can be evacuated or filled with the vaporized solvent prior to connection to the two tubes 91. The ridged pipe 96 can be a flexible tube, in the manner of FIG. 1A with the exception of the inclusion of a male quick connect valve to the first tube and a female quick connect valve on the second tube.

Figure 4B:
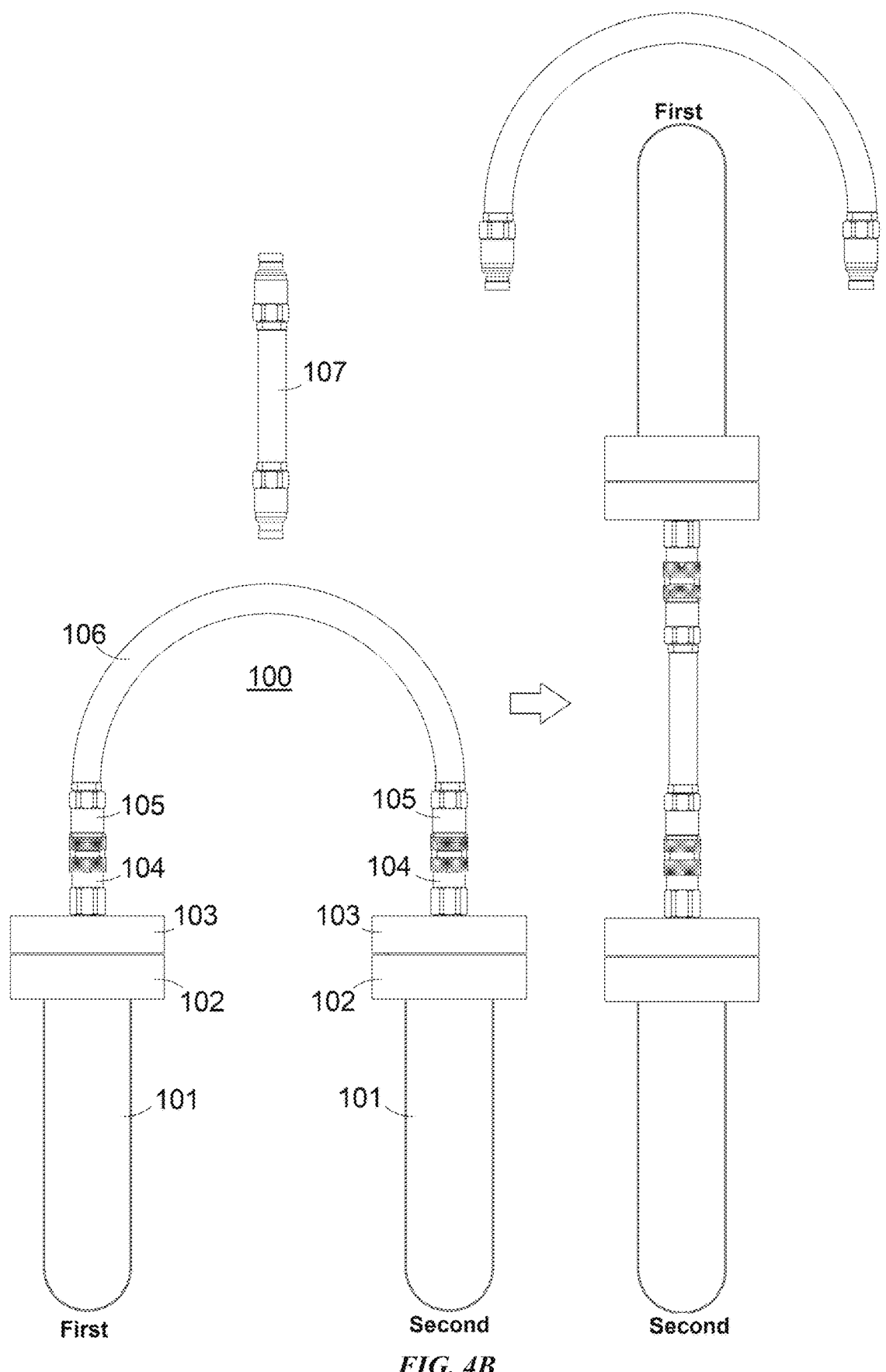
FIG. 4B shows a schematic drawing of a two 90-degree bend fixed tube and a straight connecting tube for a quasi-rotatable extraction system in: a no flow or vapor flow orientation; and a liquid flow orientation, according to an embodiment.

In another embodiment, as shown in FIG. 4B, a non-flexible extraction system (100) the first tube (101) and second tube 101 are connected to like male valve quick-disconnects (104) and the curved ridged pipe (106) has two female valves quick-disconnects (105), as does a straight pipe (107) with two female valve quick-disconnects 105, such that the curved ridged pipe 106 can be connected for distillations and the straight ridged pipe 107 can be connected for liquid transfers. The exchangeable pipes 106 and 107 can be in an evacuated or a solvent vapor filled before attachment for use.

Figure 5A:
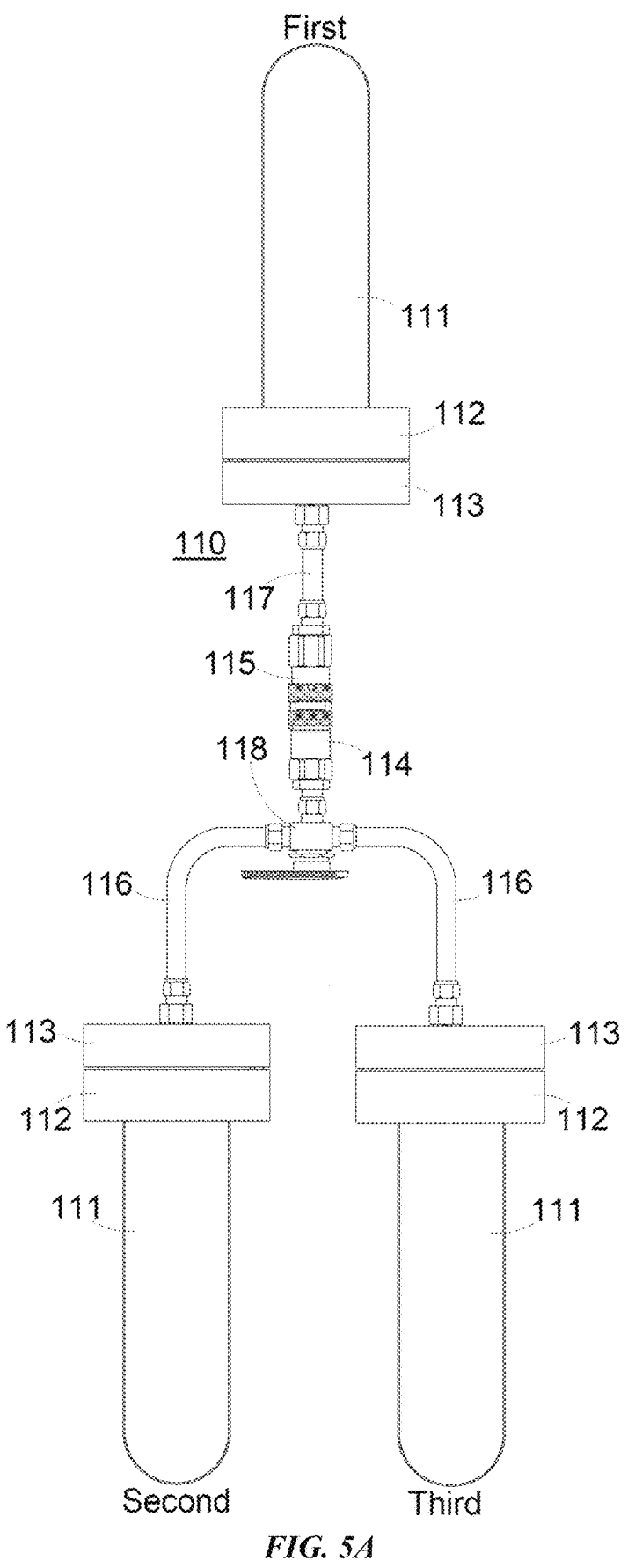
FIG. 5A shows a schematic drawing of a three-tube rotatable extraction system where the fixed connection system is rotated in its entirety, according to an embodiment.

In an embodiment, the externally rotatable extraction system (110) comprises rigid pipes with 90-degree bend pipes (116) and an optional straight pipe (117), as illustrated in FIG. 5A. In this embodiment, the entire system can be rotated between two 180-degree orientations of the straight pipe 117 relative to 90-degree bent pipes 116. The 90-degree bent pipes 116 can be coplanar or in any orientation up to a perpendicular orientation. As shown in FIG. 5A, the rotatable system 110 has first, second, and third extraction tubes (111) attached via bungs (112) with securable caps (113) that are fixed to a proximal end of rigid pipes 116 and rigid pipe 117. As illustrate, quick-disconnects (114) and (115) are connected between pipe 17 and a valve (118), shown as a ball valve, that can selectively fluidly connect two or three pipes 116 117, for direction of the fluid during liquid drainage from, for example, the second to the first or third tubes 111 or for gas transfer between the second and third tubes 111 residing in a mirror image parallel orientation to each other as shown.

Figure 5B:
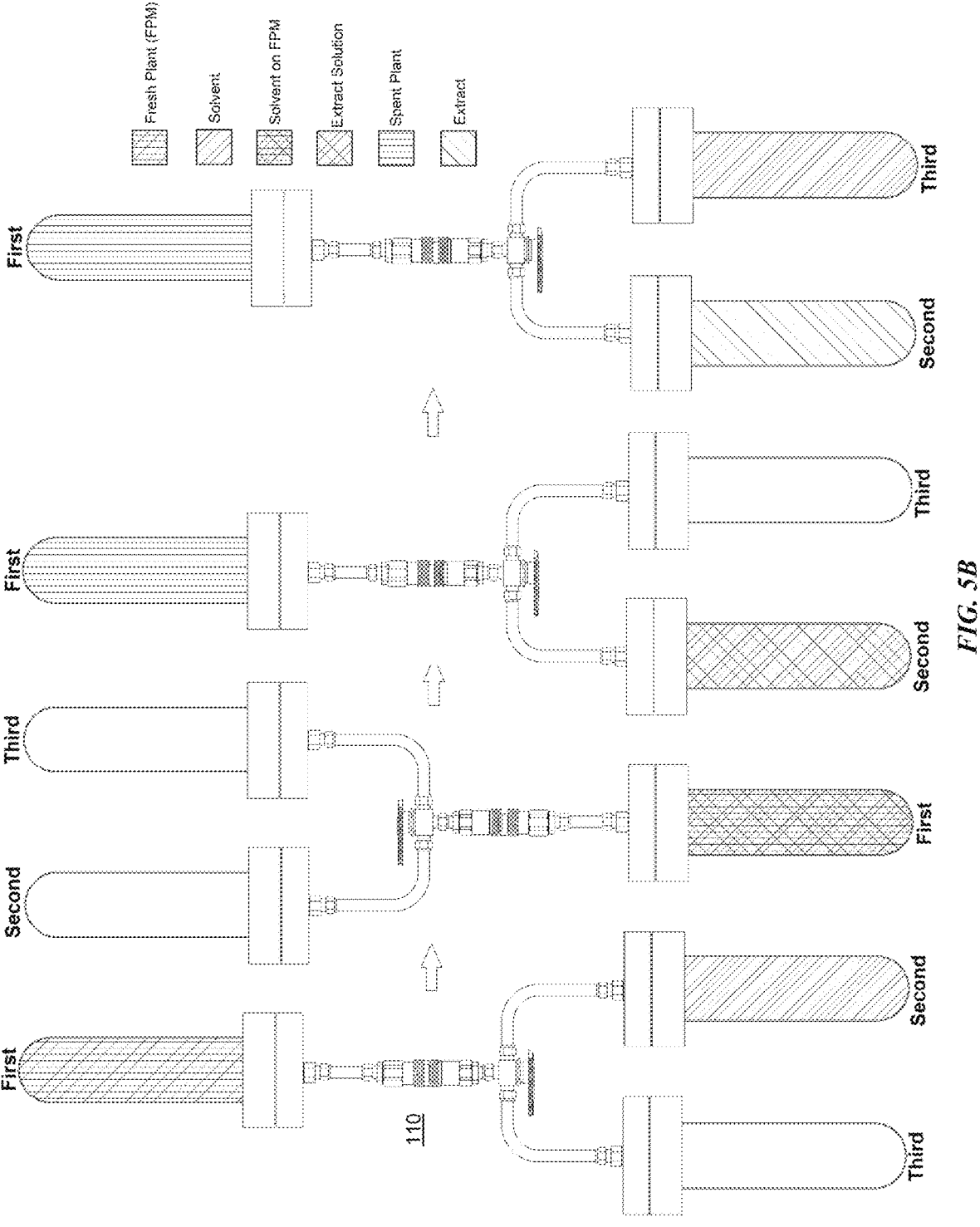
FIG. 5B shows a schematic drawing of a process to use the three-tube rotatable extraction system of FIG. 5A, according to an embodiment, with a fixed orientation of tubes employing a directional valve, according to an embodiment.

According to an embodiment, an extraction process is shown in FIG. 5B using the extraction system 110 of FIG. 5A, where in a first step, fresh plant material (FPM) placed in a second tube 111 attached via the straight pipe 117 and has solvent in a first tube 111 attached via one of the bent pipes 116. In a second step 180-degree rotation is carried out with a proper alignment of valve 118 to allow solvent transfer to be poured from the second tubes 111 to first tube 111 connected to straight pipe 117 situated at a lower altitude than the second and third tubes 111, where solvent is transferred onto FPM in the first tube 111. In a third step, the extract solution is separated from the at least partially extracted (spent) plant material with delivery of the extract solution to one of the second or third, illustrated as the second, tubes 111, as determined by the orientation of the valve 118. Retaining this system orientation, in a fourth step, solvent is distilled from the extract solution in the second tube 111 to the third tube 111 that is connected via a 90-degree bend pipe 116 with proper alignment of three-way valve 118. The return of solvent to the extracted plant material for a subsequent extraction can be carried out by inversion to the system 110 oriented with the proper alignment of valve 68 for drainage of solvent from the third tube 111 and repetition of the third and fourth steps to remove and consolidate more extract, as needed or desired, in the second tube 111 from the plant matter. When in the appropriate orientation, for example that of the third step, cooling the first tube 111, alone or with its connected straight pipe 117, solvent is distilled to their surfaces washes extract solution or extract from those surfaces to the second tube 111. Quick-disconnects 114 and 115 allow evacuating and fluid filling of the respective portions of the system.

Figure 5C:
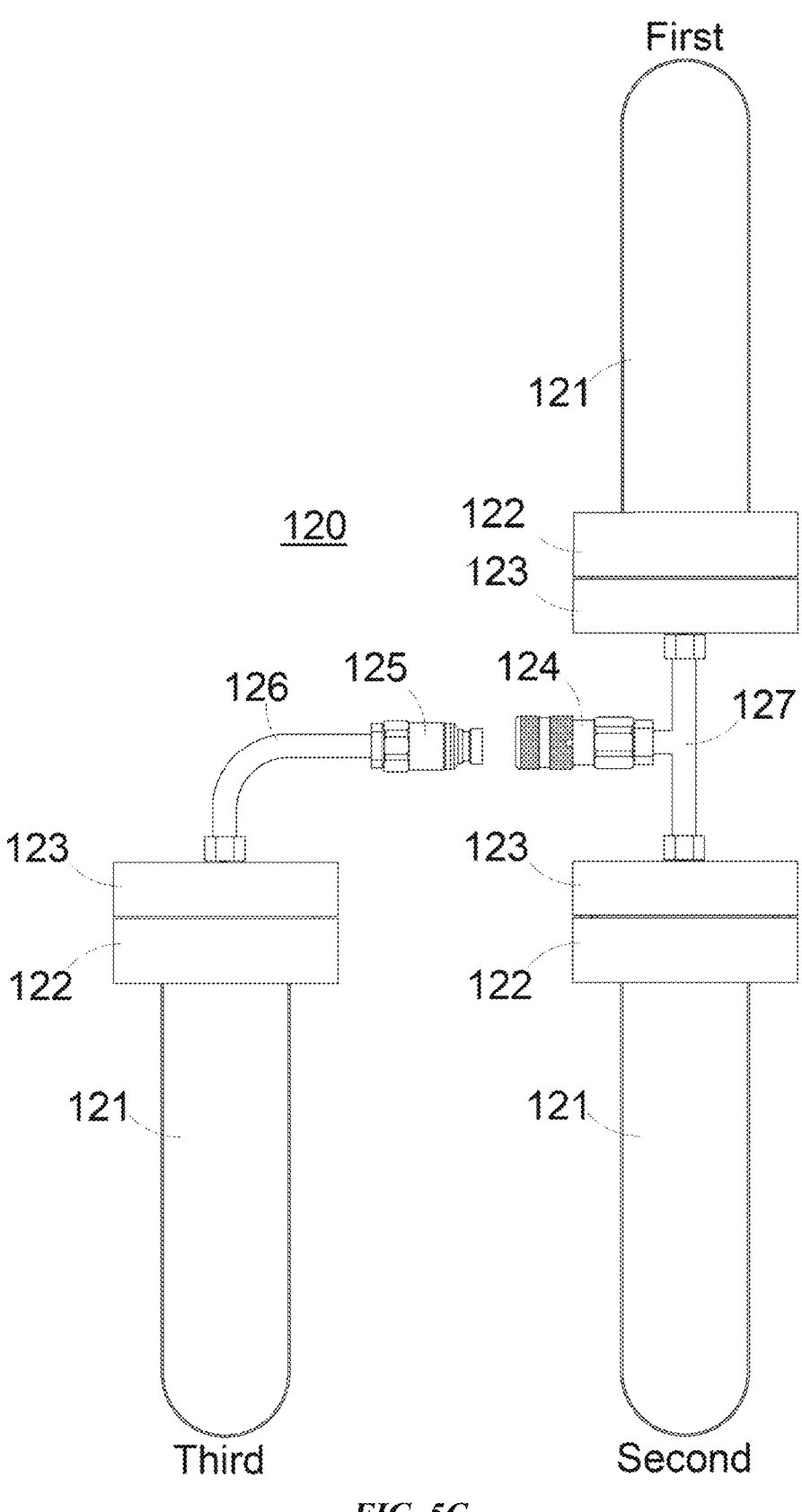
FIG. 5C shows a schematic drawing of a three-tube rotatable extraction system with a fixed orientation of two tubes and a rotatable orientation about a quick-connect valve to a third tube, according to an embodiment.

In an embodiment, shown in FIG. 5C, a rotatable extraction system (120) includes a first portion with a rigid t-pipe (127), attached to first and second tubes (121) with bungs (122) and securable caps (123) and to a first portion of a quick-disconnect (124), which allows connection to a second portion and for evacuating or solvent filling the first portion. The complementary second portion of the quick-disconnect (125) defines a second portion of system 120 where quick-disconnect 125 is connected via a bent rigid pipe (126) to a third tube 121 attached via bung 122 with securable cap 123 to allow evacuating and attachment and detachment of the second portion through quick-disconnect 125. The rotatable extraction system 120 allows an internal or external rotation to align the tubes 121 as desired.

Figure 5D:
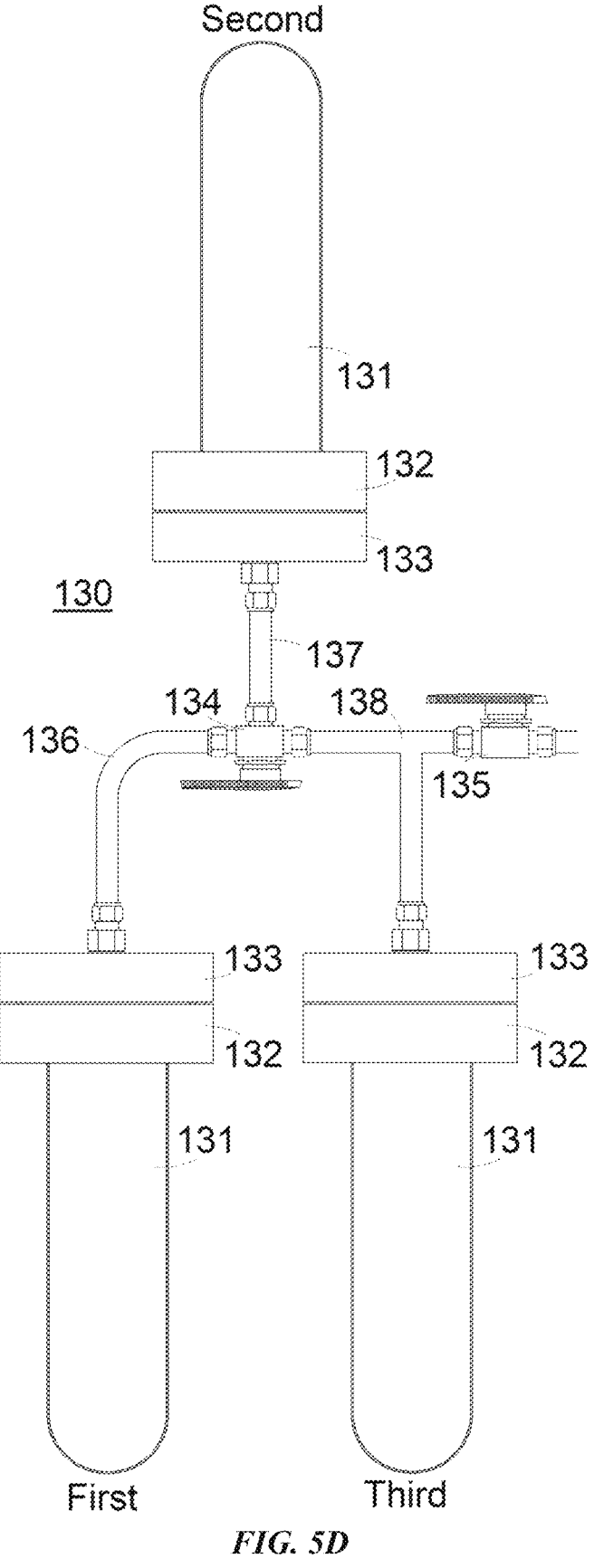
FIG. 5D shows a schematic drawing of three-tube rotatable extraction system with a fixed orientation of tubes employing a directional 3-way valve and an external access 2-way valve, according to an embodiment.

FIG. 5D shows an externally rotatable system (130), according to an embodiment, without a quick-disconnect, rather having extraction tubes (131) attached via bungs (132) with securable caps (133) fixed to a proximal end of bent pipe (136), rigid pipe (77), and t-pipe (78) without any component that allow rotation of the fixed extraction tubes relative to each other. As illustrate in FIG. 5D, a three-way ball valve (134) connects between pipes 136, 137, and 138 with a two-way ball valve (135) connected to t-pipe 138. Valve 134 allows the direction of fluid flow between pairs of the extraction tubes. Valve 135 connected to a vacuum pump or other evacuation source allows evacuation and connected to a solvent reservoir allows addition and removal of solvent.

Figure 5E:
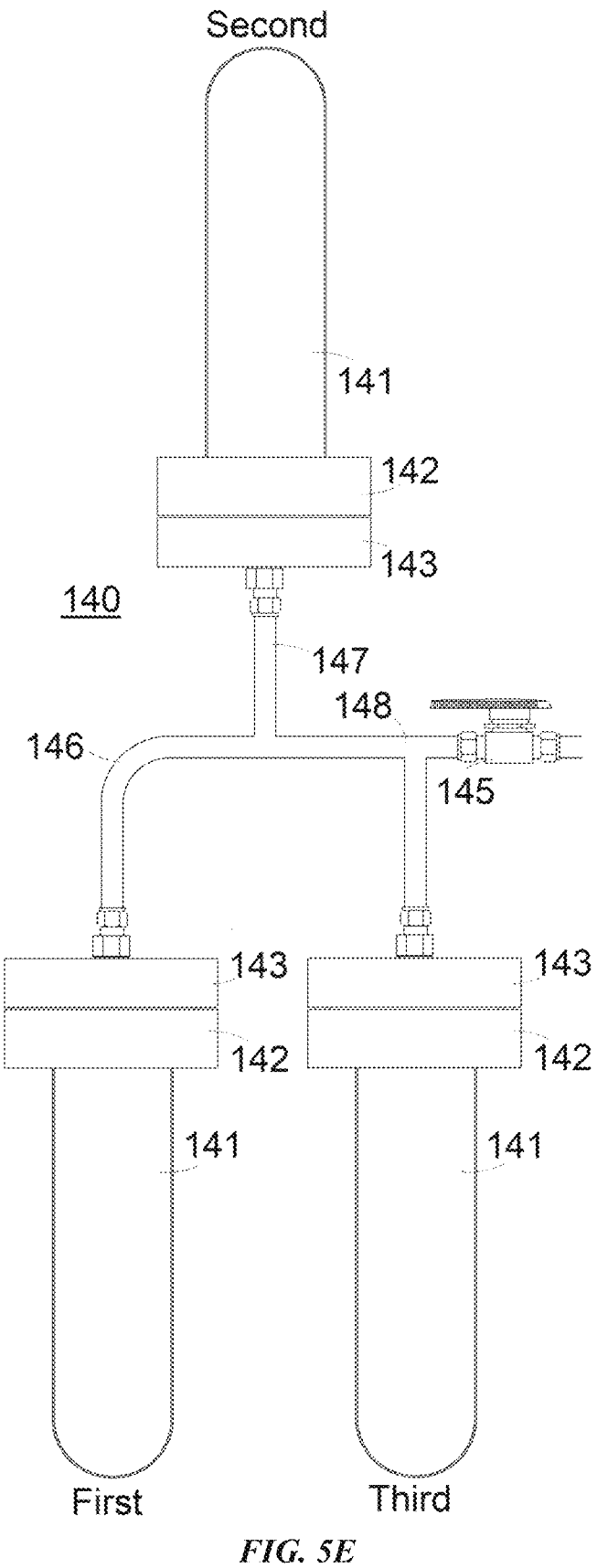
FIG. 5E shows a schematic drawing of three-tube rotatable extraction system with a fixed orientation of tubes employing an external access 2-way valve, according to an embodiment.

FIG. 5E shows an externally rotatable system (140), according to an embodiment, having extraction tubes (141) attached via bungs (142) with securable caps (143) that is fixed to a proximal end of bent and rigid pipes (146) and (147), connected at a t, and a second t-pipe (148), lacking components that allow reorienting the fixed extraction tubes 141 relative to each other. As illustrate in FIG. 5D a two-way ball valve (145) is connected to t-pipe 148. The fluid communication between exclusively the first and second, or second and third, extraction tubes 171 is defined by the rotated orientation of the entire system where the two fluid communicating tubes can be biased by a slight tilt of the system from 180-degrees such that one of the first and third tubes 141 is positioned lower than the other such that fluid preferentially flows by gravity to the lower tube 141 rather than the higher tube 141. Valve 145 can be connected to vacuum pumps and solvent reservoirs and opened for evacuation and the addition and removal of solvent from the system and closed to carry out the transfers during the process in a sealed closed system. This extraction system is well suited to viscous or solid extracts.

Figure 5F:
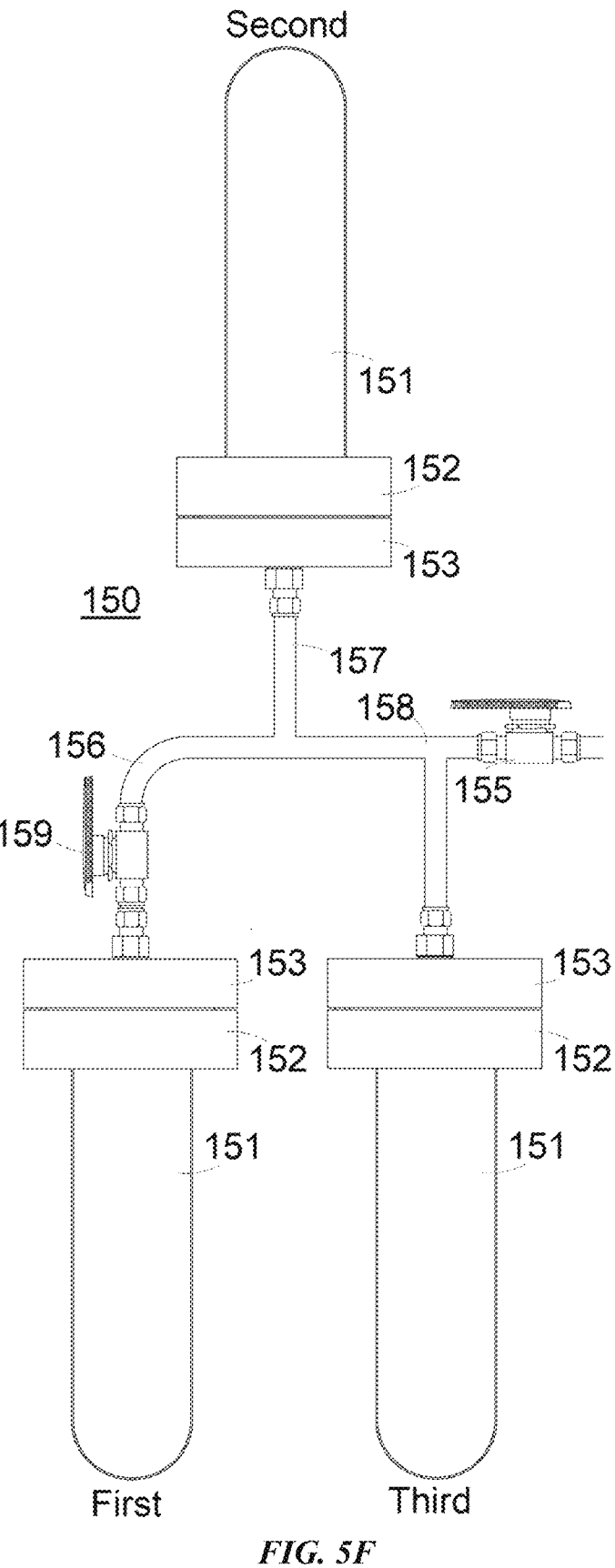
FIG. 5F shows a schematic drawing of a three-tube rotatable extraction system with a fixed orientation of two tubes with two 2-way valves, according to an embodiment.

FIG. 5F shows a rotatable system (150), according to an embodiment, having extraction tubes (151) attached via bungs (152) with securable caps (153) that is fixed to a proximal end of bent and rigid pipes (156) and (157), connected at a t, and t-pipe (158) without parts that allow rotation of the fixed extraction tubes relative to each other. As illustrate in FIG. 5E, a two-way ball valve (155) is connected to t-pipe 158. The inclusion of second two-way ball valve (159) at the first tube 151 allows inversion of the three-tube extraction system 150 with the closed valve 159 preventing extract from flowing from the first tube.

Figure 6:
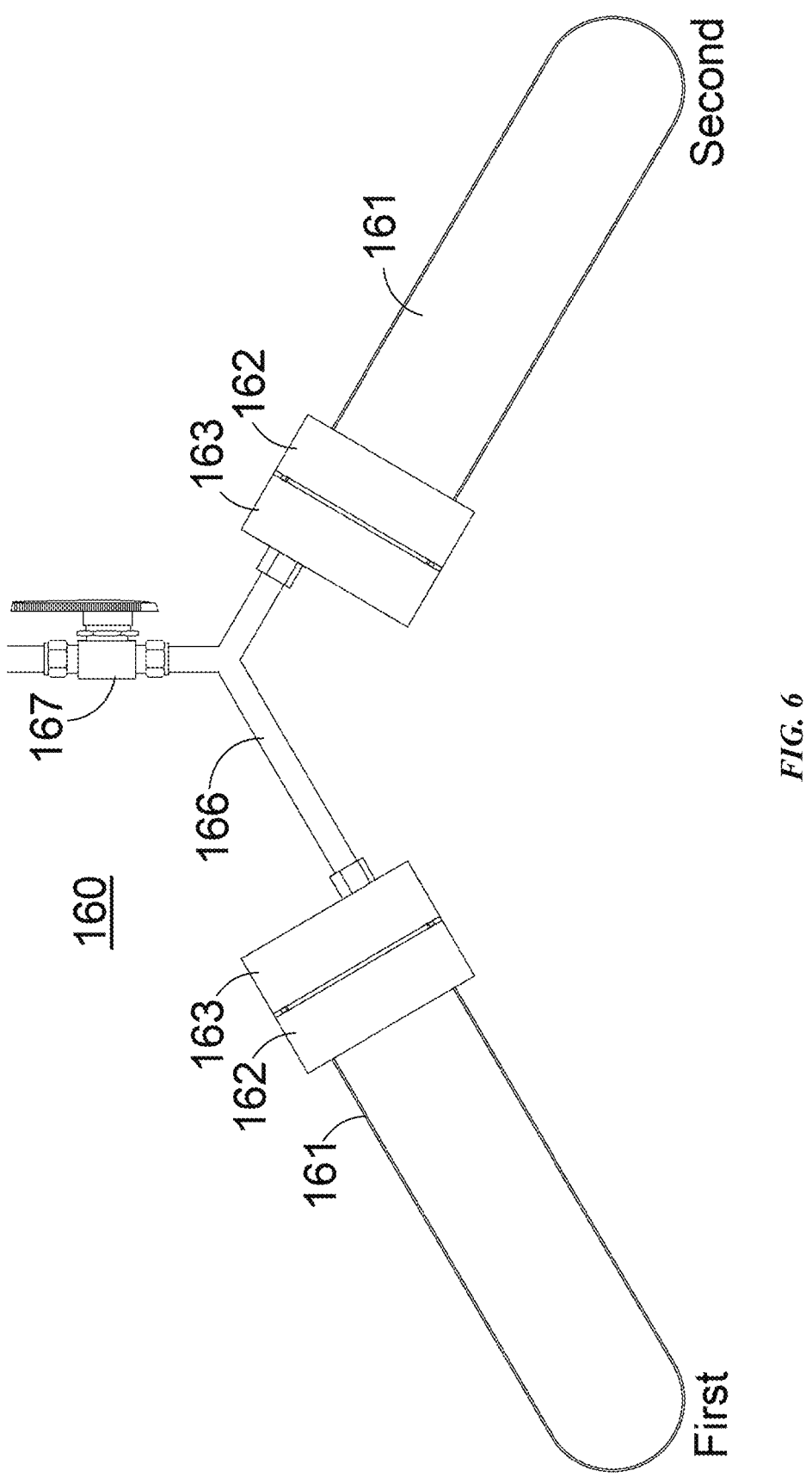
FIG. 6 shows a schematic drawing of a two-tube rotatable extraction system with a fixed orientation of two tubes, according to an embodiment.

In an embodiment, as shown in FIG. 6, an external rotatable extraction system (160) includes a 120-degree t-pipe (166) that attaches first and second tubes (161) via bungs (162) with securable caps (163) to a two-way ball valve (167) which allows a connection to evacuate, and solvent fill the system 160. The connection of each end oft-pipe 166 is to a site on the cap's 163 face near the side of the tube 161 to bias the exit of liquid while pouring extract solution transfer and to bias the gas exit to the high point of the tube 161 during isolation of the extract. The extraction system lacks any parts that allow rotation of the two extraction tubes relative to each other. The two-way valve 167 allows isolation of the tubes and connection of the tubes to a vacuum pump and to a solvent reservoir. An additional valve or a three-way valve rather than a two-way valve may be used. Solvent is transferred to an external solvent reservoir from an extract solution at the end of the process.

The tubular vessels, tubes, can be fixed to: a bung and securable cap that are flanges connected by a plurality of bolts; a bung and securable cap fixed by a that are flanges coupled by a clamp; a threaded bung and a threaded securable cap; a bung as a flange of the end of a tube and a securable cap flange connected by a plurality of bolts; a bung as a flange of the end of a tube and a securable cap flange coupled by a clamp; by having a threaded tube without a bung and a threaded securing cap, or by any other means. The tubes can be closed at one end or have a secured cap or plug at one end in addition to the caps that addresses the conduit(s) to other tubes, for loading and unloading the fresh and spent extractable material. The cap can be oriented perpendicularly, or at some other angle, rather than aligned with the tube. The plurality of tubes used in a single extraction system do not need to be of the same volume, diameter, length, or geometry. Any tubes, bungs, caps, or plugs may include a sight glass through which the state of the plant material, solvent, or solution may be observed if desired. Any tubes, bungs, caps, or plugs may include a pressure release if desired. A tubular vessel that is intended to contain extractable material can include a screen or, optionally or additionally, a filter bag, a fibrous plug, or any other means can isolate a solid extractable material that has fine particles that would inhibit the proper function of the system employed or to assure no undesired contamination of the extract with particles. A plug or base cap can be included in the tubes for accessing the tube from that end or for separating and storing an extract in the base cap from the tube in which it is concentrated during an extraction process. Various tubular vessels, including a tube and features to allow filling, emptying, and isolation of material as needed, such as a screen or filter, are exemplified below.

Figures 7A, 7B, 7C:
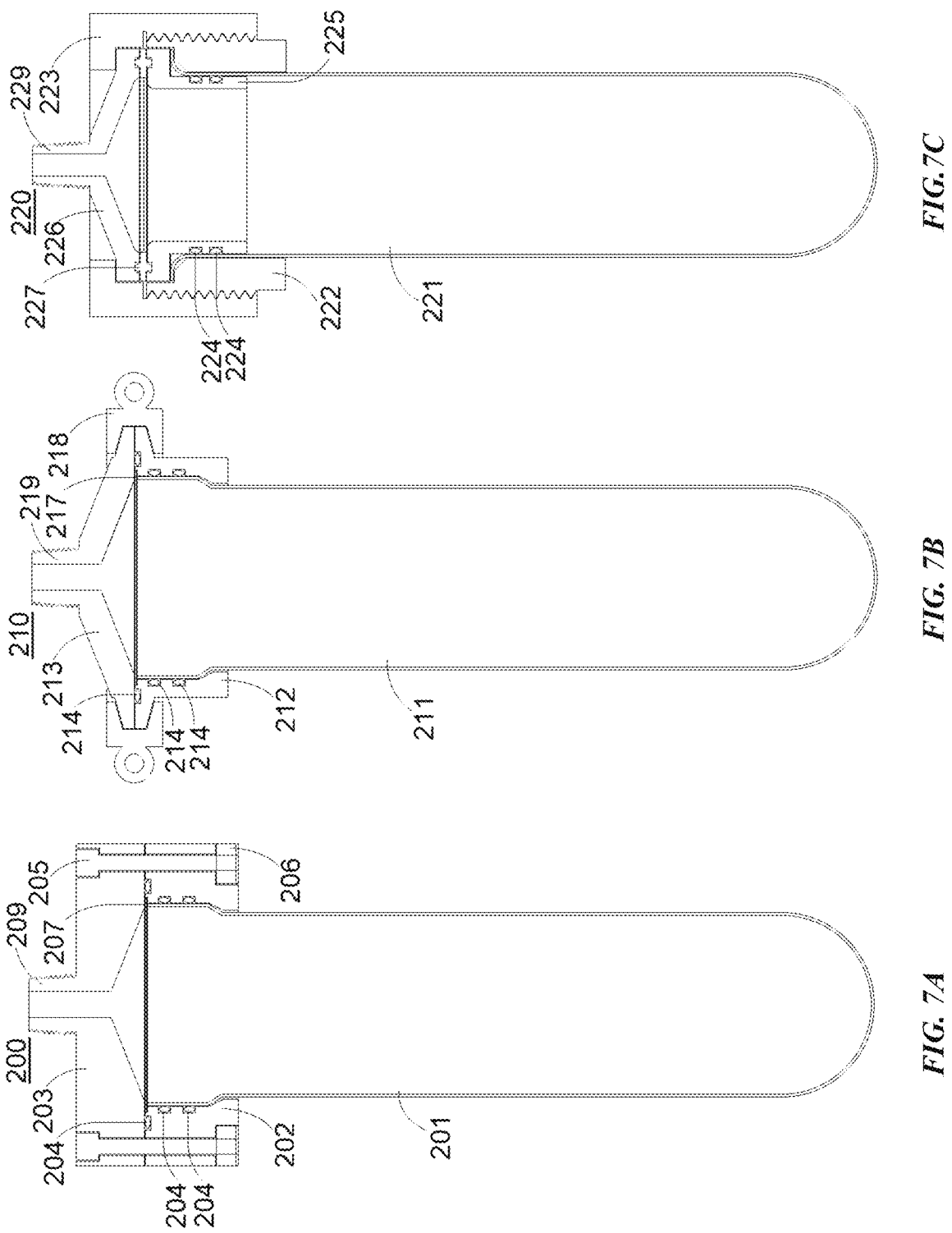
FIG. 7A shows a cross-sectional drawing of a tube secured with a bung and cap secured with bolts, according to an embodiment.
FIG. 7B shows a cross-sectional drawing of a tube secured with a bung and cap secured with a clamp, according to an embodiment.
FIG. 7C shows a cross-sectional drawing of a tube secured with a threaded bung and threaded cap, according to an embodiment.

As shown in FIG. 7A, an exemplary tubular vessel (200) has a bung (202) that couples to a securing cap (203) by two or more bolts (205) and nuts (206) where a seal is achieved to the tube (201) by a plurality of O-rings (204). The securing cap 203 includes a threaded male connector (209) at its outlet for connecting a hose, pipe, a filter, or quick-disconnect. Alternatively, a securing cap 203 of sufficient thickness can have a threaded female connector, or a tube can extend in place of the threaded male connector 209 for securing using a nut with a compression fitting or the threaded connector can be the female portion of a compression fitting. A screen (207) or other filtration disk included, as shown, between the bung 202 and securing cap 203 or coupled to the connector on the securing cap 203 or other position before the connection of the quick-disconnect allows filtration. The screen or filter is not needed if the tubular vessel 200 is not intended to contain the extractable material. Though illustrated with securing cap 203 having a funnel shaped, conical, connection to the threaded male connector 209, a flat or other shaped cavity can be employed.

As shown in FIG. 7B, an exemplary tubular vessel (210) has a bung (212) that couples to a securing cap (213) using a clamp (218) where a seal is achieved to the tube (211) by a plurality of O-rings (214). The securing cap 213 includes a threaded male connector (219) for connecting a hose, pipe, filter, or quick-disconnect. A screen (217) or other filtration component can be included, as shown, between the bung 212 and securing cap 213 or coupled to the connector on the securing cap 213 or other position before the connection of the quick-disconnect.

As shown in FIG. 7C, tubular vessel (220) has a bung (222) that couples to a securing cap (223) where a seal is achieved to the tube (221) by at least one O-ring, shown as a plurality of O-rings (224). The bung 222 and securing cap 223 are threaded to compress and seal between a bottom sealing portion (225) and a top sealing portion (226) that secure a screen (227) that is configured as a sanitary screen for sanitary couplers, although any type of screen and mode of securing the screen can be employed. Alternatively, a screen or other filter of a different type can be substituted for the sanitary screen 227 and that screen or filter can be coupled to the connector on the top sealing portion 226 or other position before the connection of the quick-disconnect. The top sealing portion 226 includes a threaded male connector (229) for connecting a hose, pipe, or quick-disconnect.

Figures 7D, 7E, 7F:
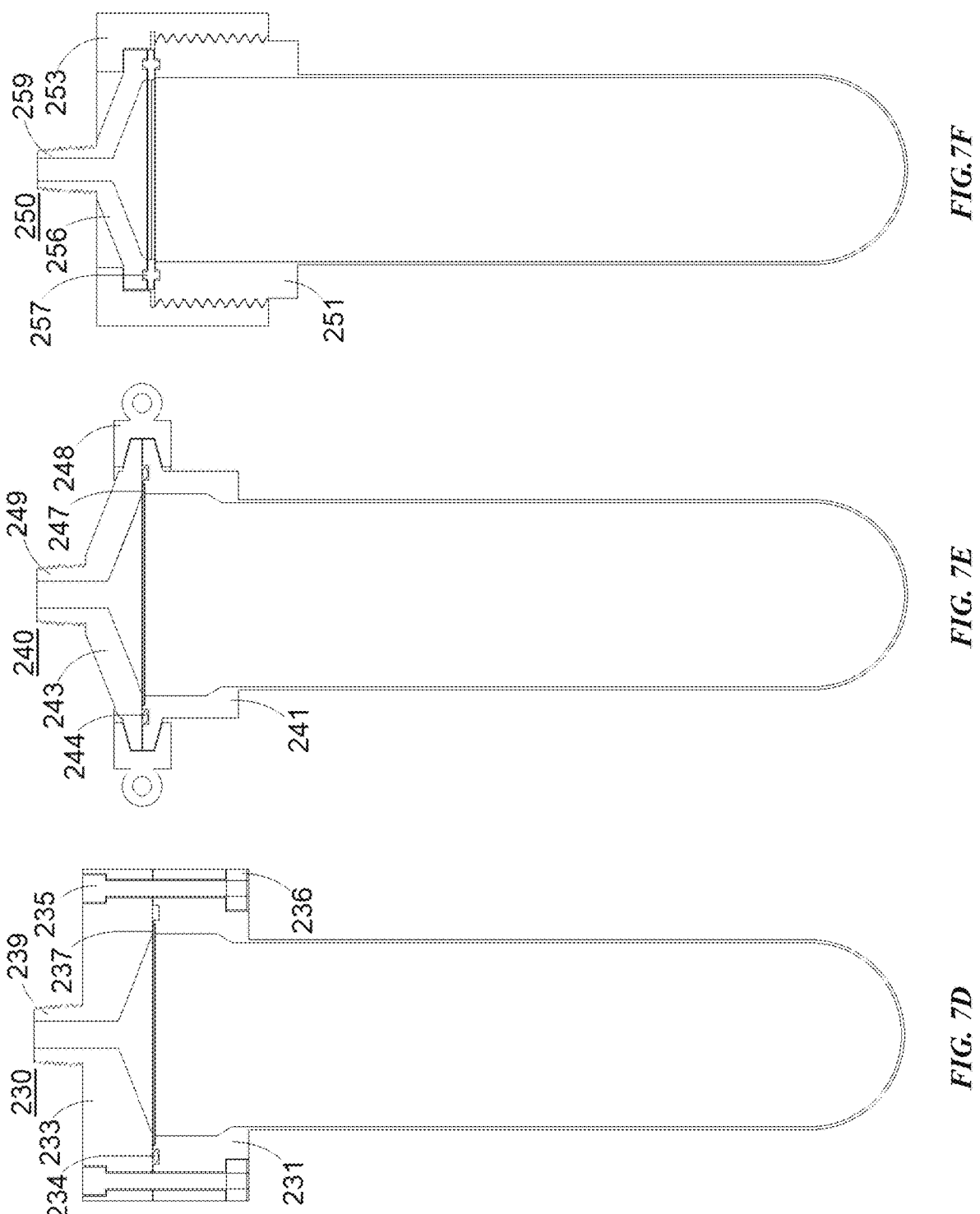
FIG. 7D shows a cross-sectional drawing of a tube secured with a bung that is a portion of the tube and a cap secured with bolts, according to an embodiment.
FIG. 7E shows a cross-sectional drawing of a tube secured with a bung that is a portion of the tube and a cap secured with a clamp, according to an embodiment.
FIG. 7F shows a cross-sectional drawing of a tube secured with a threaded bung that is a portion of the tube and a threaded cap, according to an embodiment.

As shown in FIG. 7D, tubular vessel (230) has a combined tube and bung (231) that couples to a securing cap (233) by two or more bolts (235) and nuts (236). The securing cap 233 includes a threaded male connector (239) for connecting a hose, pipe, a filter, or quick-disconnect. A screen (237), as shown, or other filtration component can be situated between the combined tube and bung 231 and securing cap 233 or coupled to the connector on the securing cap 233 or other position before the connection of the quick-disconnect.

As shown in FIG. 7E, tubular vessel (240) has a combined tube and bung (241) that couples to a securing cap (243) using a clamp (248). The securing cap 243 includes a threaded male connector (249) for connecting a hose, pipe, a filter, or quick-disconnect. A screen (247) as shown or other filtration component between the combined tube and bung 241 and securing cap 243 or coupled to the connector on the securing cap 243 or other position before the connection of the quick-disconnect.

As shown in FIG. 7F, tubular vessel (250) has a combined tube and bung (251) couples to a securing cap (253). The combined tube and bung 251 and securing nut 253 are threaded to compress and seal the combined tube and bung 251 to a top sealing cap (256) that employs a screen (257) configured as a sanitary screen for sanitary couplers, although any type of screen and mode of securing the screen can be employed. The top sealing cap 256 includes a threaded male connector (259) for connecting a hose, pipe, or quick-disconnect. The connection, as with all other tubes can be with a weld or compression fitting, or any secure leak tight connection. Alternatively, a screen or filter, substituted for the sanitary screen 257, coupled to the connector on the securing nut 253 or other position before the connection of the quick-disconnect functions in the manner of the sanitary screen 257.

In an embodiment, as shown in FIG. 8A, the tubular vessel (260) includes a combined tube and bung (261) having external threads and the securing cap (262) has internal threads that secures an optional screen (264), where securing cap 262 includes a male connector (263). Again, the cap as shown has a threaded male connector 263 situated along the cylindrical axis of the securing cap 262, but this outlet can be situated elsewhere in the cap, such as near the periphery of the cap or even on the side of the cap above the threading. Alternatively, a filter of any type can replace the optional screen 264.

In an embodiment, as shown in FIG. 8B, the tubular vessel (265) includes a combined tube and bung (266) having internal threads and a securing cap (267) that has external threads that secures an optional screen (269), where securing cap 262 includes a male connector (268). Alternatively, a filter of any type can replace the optional screen 269.

Figures 8C, 8D, 8E:
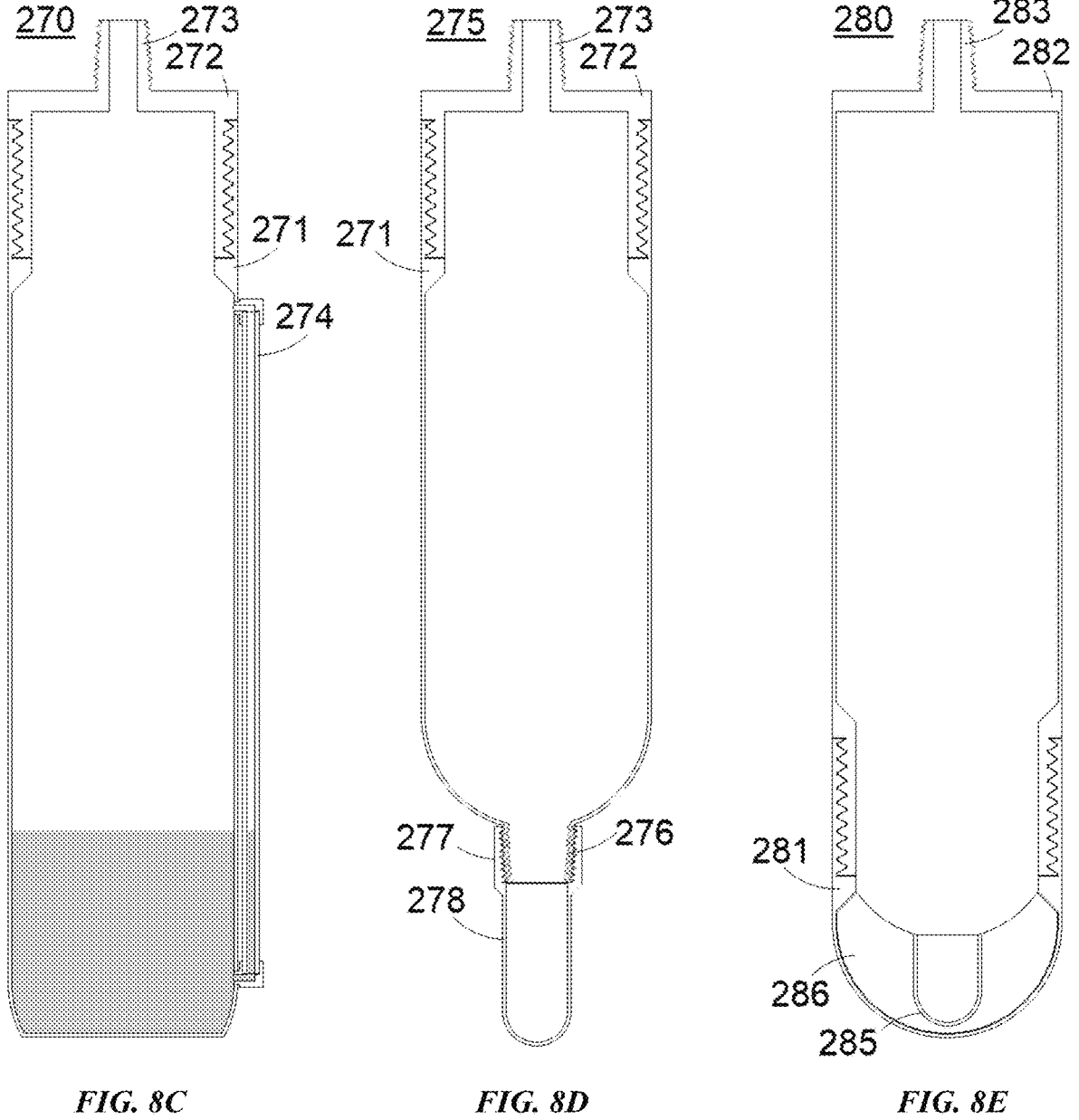
FIG. 8C shows a cross-sectional drawing of a tube secured with an internally threaded bung that is a portion of the tube and an externally threaded plug and with a sight glass tube, according to an embodiment.
FIG. 8D shows a cross-sectional drawing of a tube secured with an internally threaded bung that is a portion of the tube and an externally threaded plug and a connected small volume extract vessel, according to an embodiment.
FIG. 8E shows a cross-sectional drawing of a tube secured with an internally threaded bung that is a portion of the tube and an externally threaded plug with an internal fitted gasket holding a small extract vessel, according to an embodiment.

In an embodiment, as shown in FIG. 8C, the tubular vessel (270) includes a combined tube and bung (271)

having internal threads and a securing cap (272) that has external threads and a male connector (273). The tube 271 has a flattened base that allows the tube to stand alone if desired. Tubular vessel 270 includes a sight glass tube (274) to observe the level of extract solution present during processing.

In an embodiment, as shown in FIG. 8D, the tubular vessel (275) includes a combined tube and bung (271) having internal threads and a securing cap (272) that has external threads and a male connector (273). The combined tube and bung 271 have a base threaded male connector (276) for connection to a small volume extract vessel (278) via a threaded female connector (277) such that an extract of a small volume may be easily collected and removed from combined tube and bung 271. The size and shape of extract vessel 278 can vary as defined by the anticipated extract quantity and exchanged for different extractable material as desired.

In an embodiment, as shown in FIG. 8E, the tubular vessel (280) includes a combined tube and bung (281) having internal threads and a securing cap (282) that has external threads and a male connector (283) where the securing cap 282 extends the connecting threads to a significant distance from the male connector 283 such that the volume within the cap defines a majority of the volume of tubular vessel 280. The combined tube and bung 281 have a small volume and accepts a fitted gasket (286) that accepts a small extract vessel (285) in a manner where the fitted gasket 286 seals and directs the extract to the small extract vessel, which is directly accessible for removal upon decoupling the threads when the extraction process is complete. The fitting gasket 286 can be formed from an elastomer that can be deformed to place within the system. Different fitting gasket 286 can be used to hold extraction vessel 285 of varied sizes. Where the combined tube and bung 281 and the securing cap 282 have the relationship of those illustrated in FIGS. 7A through 8A, the fitting gasket need not be of an elastomer, but can be aa rigid plastic or other solid material as the cylindrical wall of the fitted gasket can be slid into the tube portion of the vessel.

In an embodiment, as shown in FIG. 8F, the tubular vessel (290) is a sealed tube (291) having a threaded male connector (292) and a side port (293) with male threads to accept a threaded plug (294) with female threads. Inclusion with extractable matter, is through side port 293. A screen (296) is inserted through the side port 293 and secured with a securing ring (297) by tension or any other means accessible through side port 293 allows filtration.

In an embodiment, as shown in FIG. 8G, the tubular vessel (295) is a sealed tube (291) having only a side port (293) with male threads to accept a threaded plug (298) with female threads which includes a threaded male connector (292) to connect into an extraction system. Inclusion of extractable matter is by introduced through side port 293, an optional screen (299) cis secured by the side port 293 and the threaded plug 298.

Figure 9A:
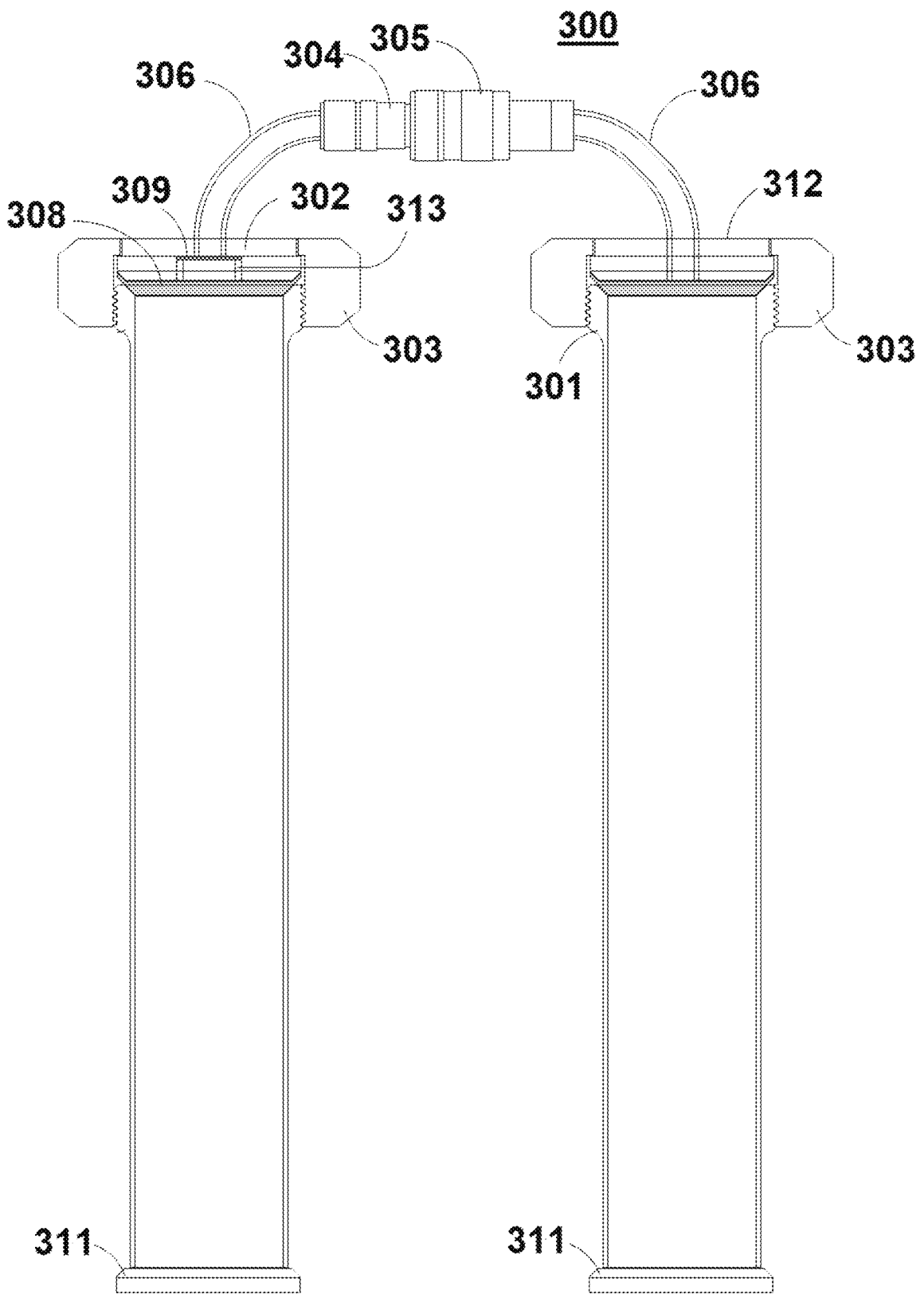
FIG. 9A shows a cross-sectional drawing of a tube secured with a threaded tube and a plug plate secured by a gasket and a bolt, according to an embodiment.

In an embodiment, as shown in FIG. 9A, the two-tube rotatable extraction system (300) has combined tube and bung (301) with plug caps (302) and (312) that are soldered, welded, or otherwise sealed to bent pipes (306) that connect to male valve quick-connect (304) and female valve quick-connect (305). Tubes 301 have flat ends (311) such that the tube needs no support on a base, such as a table, or within a bath with a flat or flat base. The plug caps 302 and 312 are secured by nuts (303), which compresses a gasket (308) against plug cap 302 or 312 to seal the tubes 301. The nuts 303 can be hand tightened after introduction of plant matter and subsequently hand tightened to for a leak free seal in the system after pulling vacuum on the tubes. When the pressure exerted by the solvent is greater than the vacuum, the system is tightly sealed such that the nuts cannot be turned without tools. An optional filter (309), secured by a threaded ring (313) in plug cap 302, retains plant matter during liquid transfer of extract solution to the tube 301 with plug cap 312.

Figure 9B:
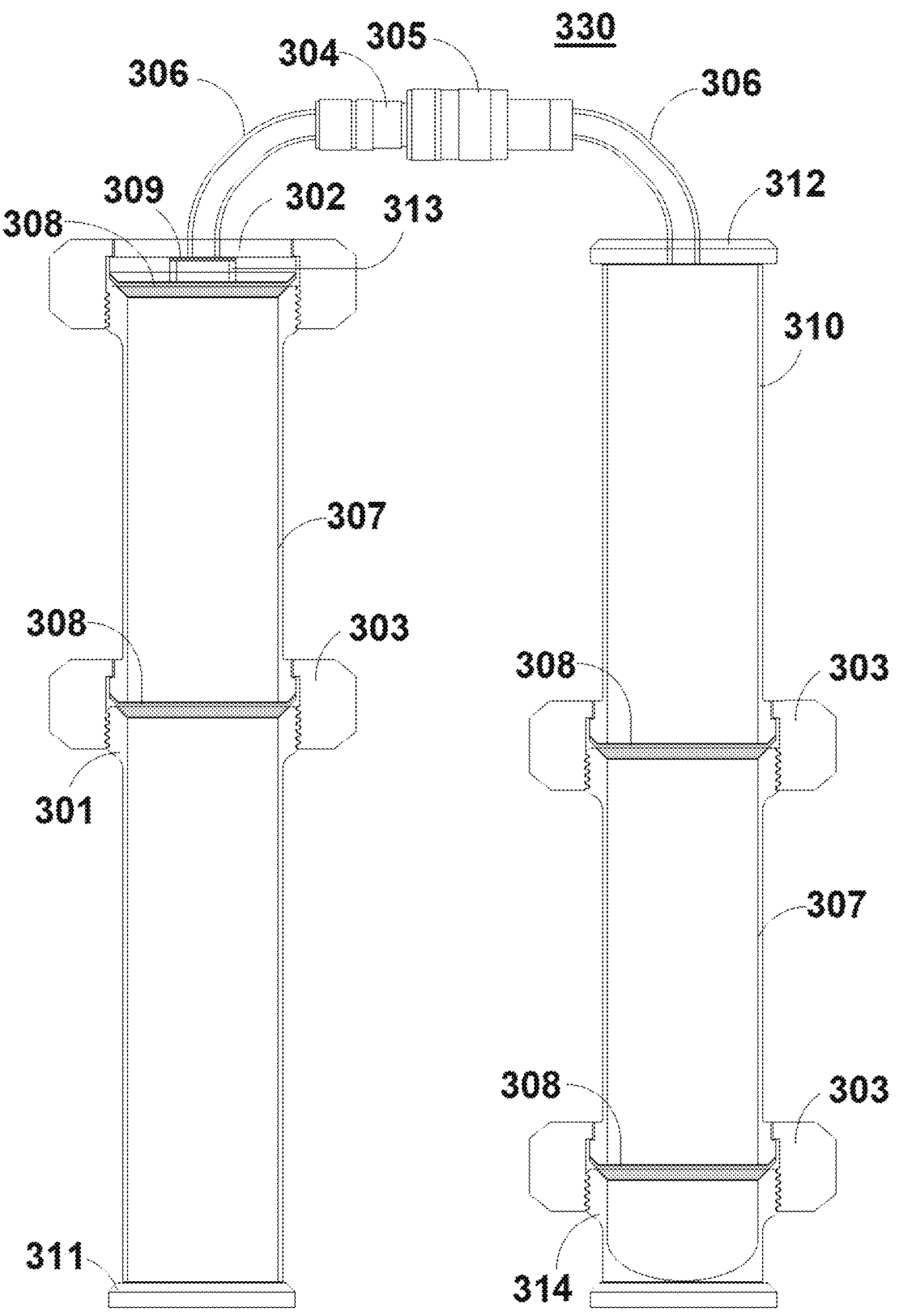
FIG. 9B shows a cross-sectional drawing of sectioned tubes secured within the composite tubes with a threaded cup and a beveled tube secured by a gasket and a bolt, according to an embodiment.

In an embodiment, as shown in FIG. 9B, the two-tube extraction system (330) employs the same tube and bung 301 as shown in FIG. 9A and the closure for the tube to receive plant matter but a tube (310) that is welded to disc (312), which is further welded to a bent pipe 306. In this embodiment, the tubes 301 are coupled to additional spacing tubes (307) to extend the combined tube as desired to increase the volume of the system 330. The combined tube for isolation of the extract terminates has a cup (314) that joined to tube 307 and has a flat base but a curved inner surface to facilitate extract removal. The curved surface within cup 314 is optional.

Figure 10A:
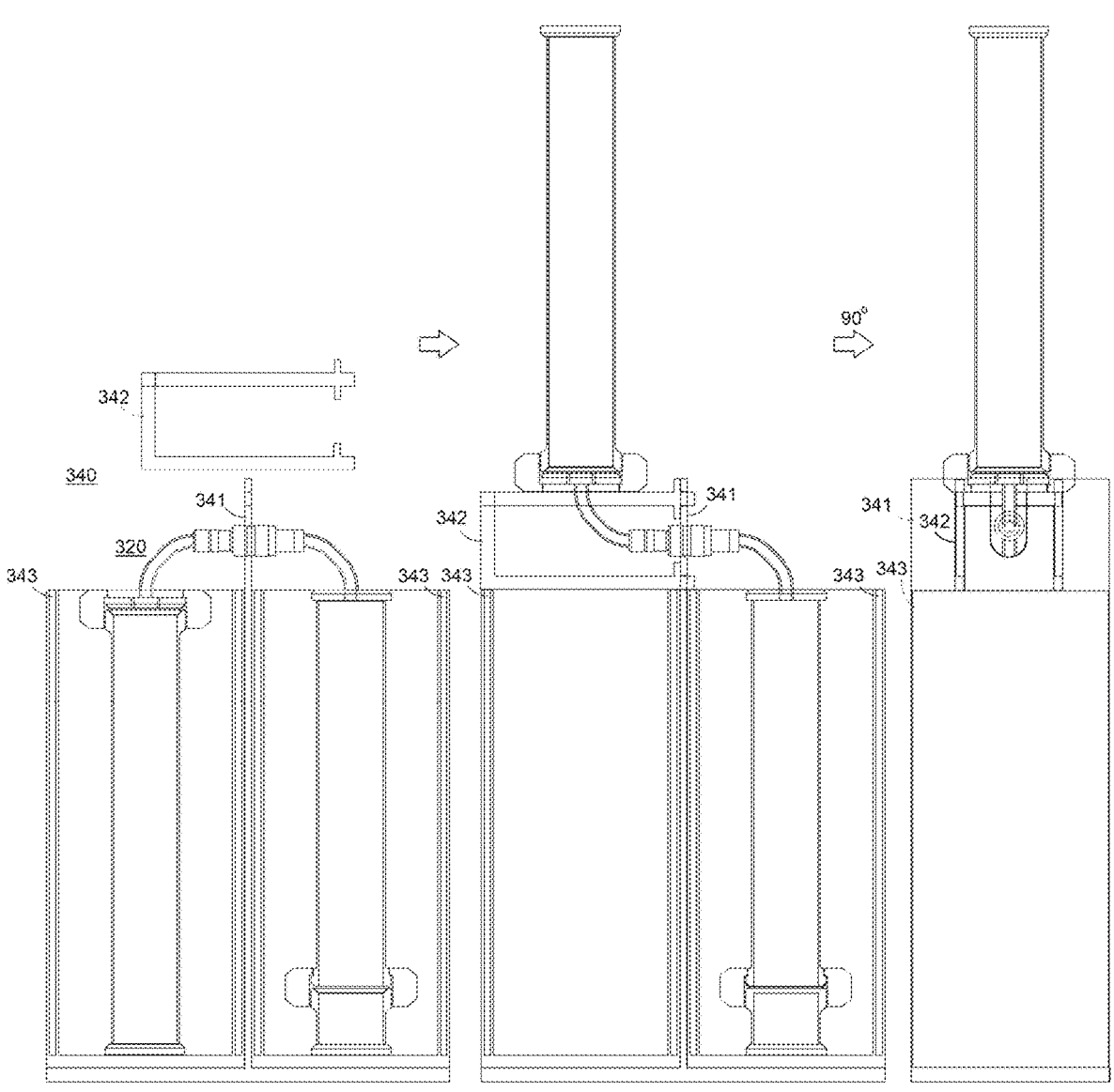
FIG. 10A shows a drawing of a non-clamping supporting device with two baths for a two 90-degree bend tubes rotatable extraction system, as in FIG. 9B without extensions, for use in a no flow or vapor flow orientation, left, and a liquid flow orientation, right, according to an embodiment.

The use of the extraction systems, according to an embodiment, do not require that the tube be clamped to a device, rather, all manipulation can be carried out by placement in a holder that secures the extraction system by gravity and places the baths for any heating or cooling in place for addition of cooling or heating fluids, where the change from a mode for liquid transfer to a mode for conducting distillation requires raising the extraction system and reorienting at least a portion of the extraction system before placing it onto a holder. As illustrated in FIG. 10A for extraction systems 320, which is equivalent to that of 330 in FIG. 9B absent the spacing tubes 307, and in FIG. 10B the extraction system 160 includes bent pipes to change transfer modes, or to reorient the fixed tubes for the two modes.

In an embodiment, as illustrated in FIG. 10A, using an extraction system 320 as illustrated in FIG. 9B without the spacing tube 307, where a support structure (340) includes a frame (341) with a pair of vertical baths (343), for insertion of vertical tubes 301, and a support insert (342) that can be inserted and removed from the frame 341 and is further supported by one of the vertical baths 343 in addition to the frame 341. The baths 343 are illustrated as Dewar flasks but can be of any form that can hold a heating or cooling liquid. As shown in FIG. 10A, the flatness of the nut 303 and cap 302 allow the draining of extract solution when supported by the support insert 342, and without the support insert 342 allows an orientation appropriate for solvent distillation. The extraction system 330 is reoriented by rotating around the quick-disconnect 304 305. The weight of the tube 301 press the support insert 342 onto the bath 293 to secure the extraction system 320.

Figure 10B:
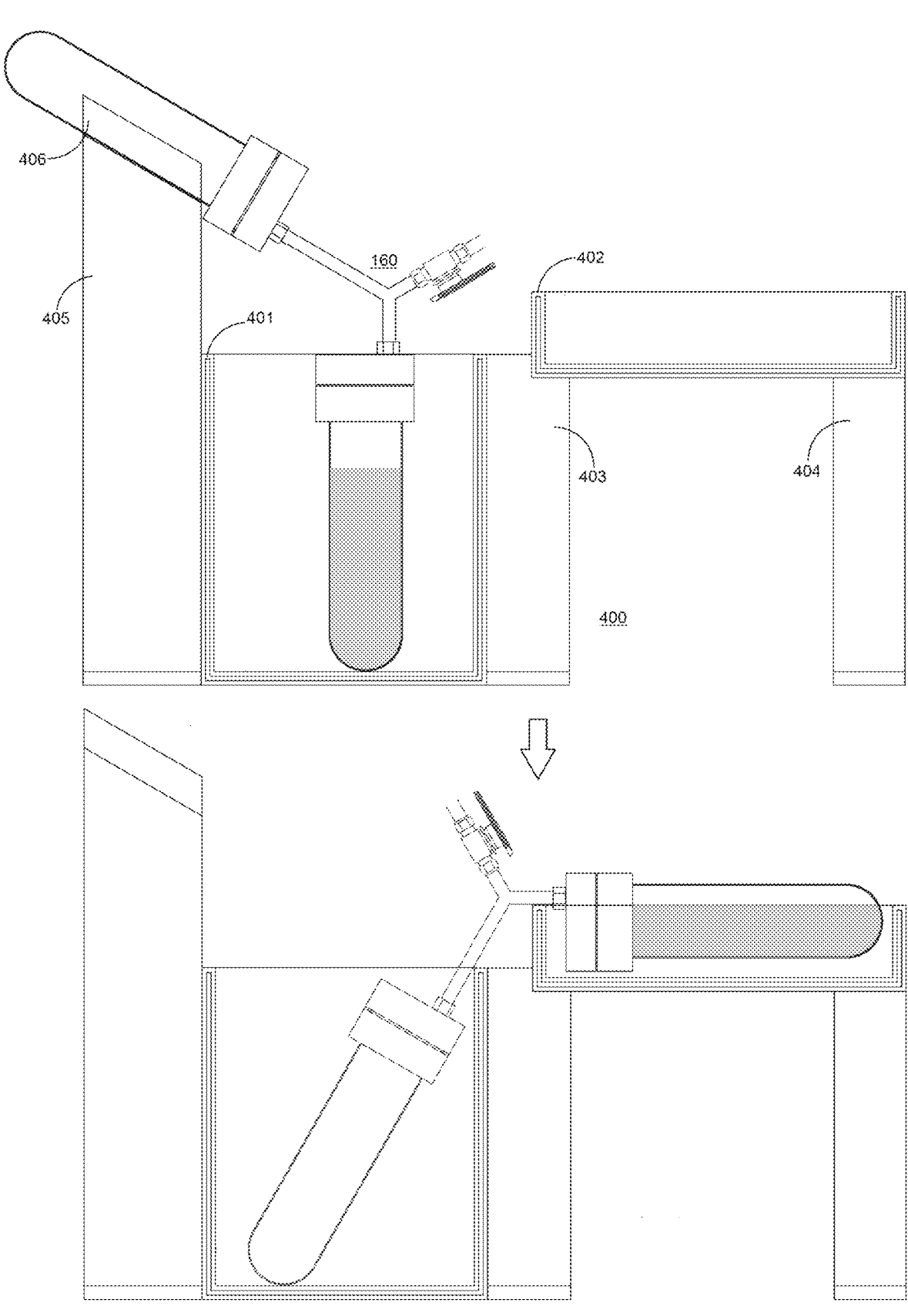
FIG. 10B shows a drawing of a non-clamping supporting device with two baths for a two 90-degree bend tubes rotatable extraction system, as in FIG. 6, for use in a no flow or vapor flow orientation, left, and a liquid flow orientation, right, according to an embodiment.

In an embodiment, as illustrated in FIG. 10B, using an extraction system 160 as illustrated in FIG. 6, a support structure (400) includes a broad vertical bath (401) and a horizontal bath (402) connected via a bath bridging support member (403) and an end support member (404). In this manner, the extraction system 160 can be lifted, rotated in the plane of the tubes 161 and t-pipe 166, and placed such that one or both baths contain a tube 161. The broad vertical bath 401 allows for a small degree of angular freedom to optimize the angle and to modify the angle during a fluid transfer as desired to achieve a desired flow and transfer rate. The liquid transfer can be performed while placing the extraction system 160 onto tube holder (406) supported by a support tower (405) to promote draining of extract solution. Transfer can be facilitated by placing the solution receiving tube 161 in a cool fluid in the broad vertical bath 401, as the temperature differential assures a favorable pressure differential for fluid flow. As shown, the portion of the extract receiving tube 161 is not filled with extract solution to avoid undesired spill over back to the extractable material containing tube 161 while distilling the solvent from the heated extract solution. In this manner, the lateral surface area for heat transfer from horizontal bath 402 to the evaporating solution and the solvent gas solution interface is optimized over the course of the distillation. A final distillation of solvent from the extract solution can be trough valve 167 to a solvent storage container.

Figure 11A:
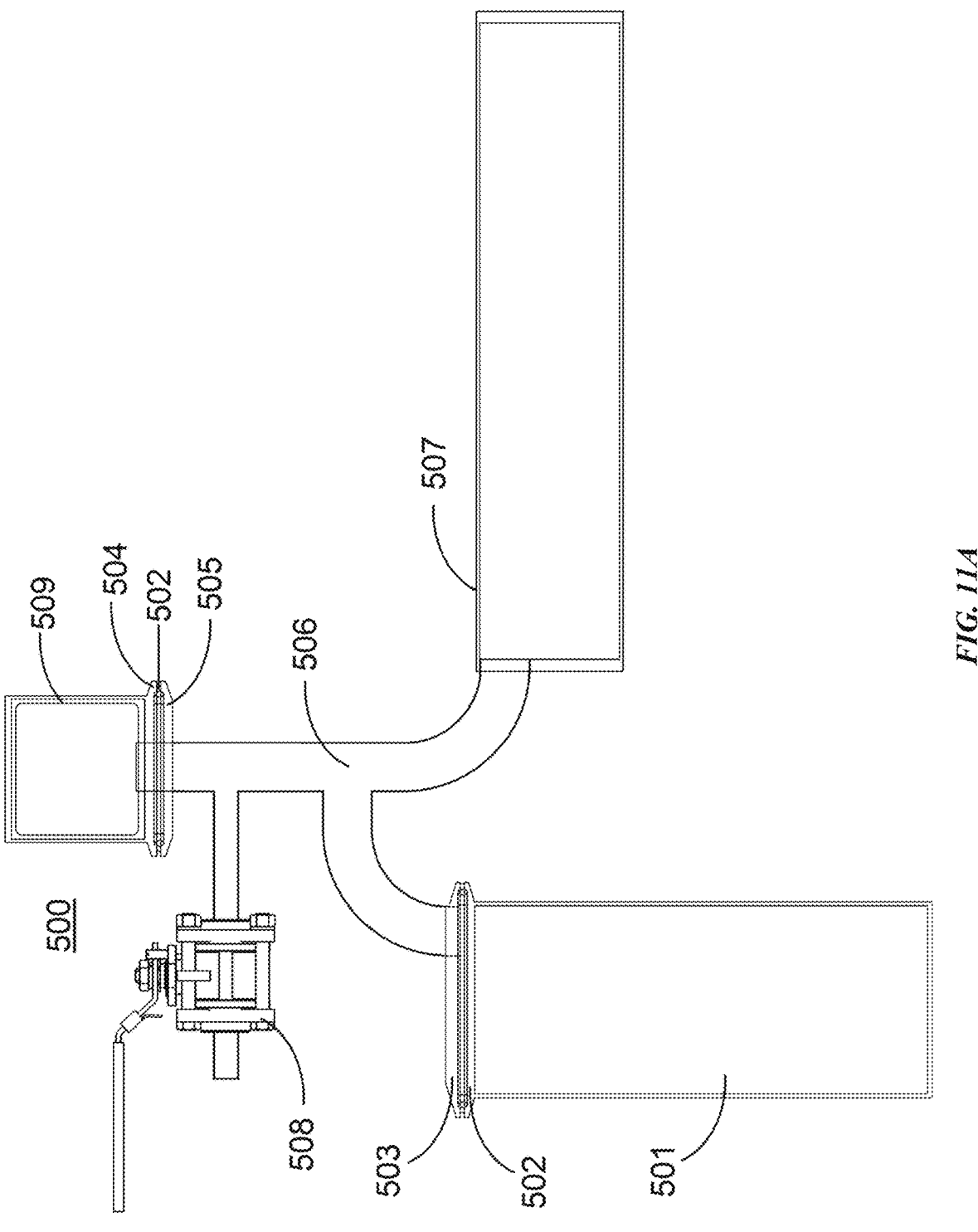
FIG. 11A shows a schematic drawing of a three-tube rotatable extraction system with a first fixed 90° orientation of two tubes and a third tube for isolated extract, according to an embodiment.

In other embodiments, an extract solution receiving tube need not have a port to open the tube. As shown in FIG. 11A, extraction system (500) has an extractable material containing tube (501) with an optional screen containing gasket (502) and a cap (503) that are clamped together in the manner shown in FIGS. 7B and 7E though clamps are not shown for clarity. Cap 503 is welded or otherwise sealed to the conduit pipe (506), which is plurally branched. One branch of pipes 506 is connected by welding, or otherwise permanently sealing, to an otherwise end sealed extract solution receiving tube (507) at an end that is held lower than cap 503 when oriented for distillation from extract solution receiving tube 507. Another branch of pipe 506 is connected to a valve (508) for evacuating, solvent vapor addition, or solvent vapor removal with the extraction system 500. Another branch of pipe 506 is connected to an extract receiving cap (505) of an extract tube (504) with a screen containing gasket 502. The extract tube 504, as shown, contains an optional jar (509) for directly partially packaging the extract during the extraction process.

Figure 11B:
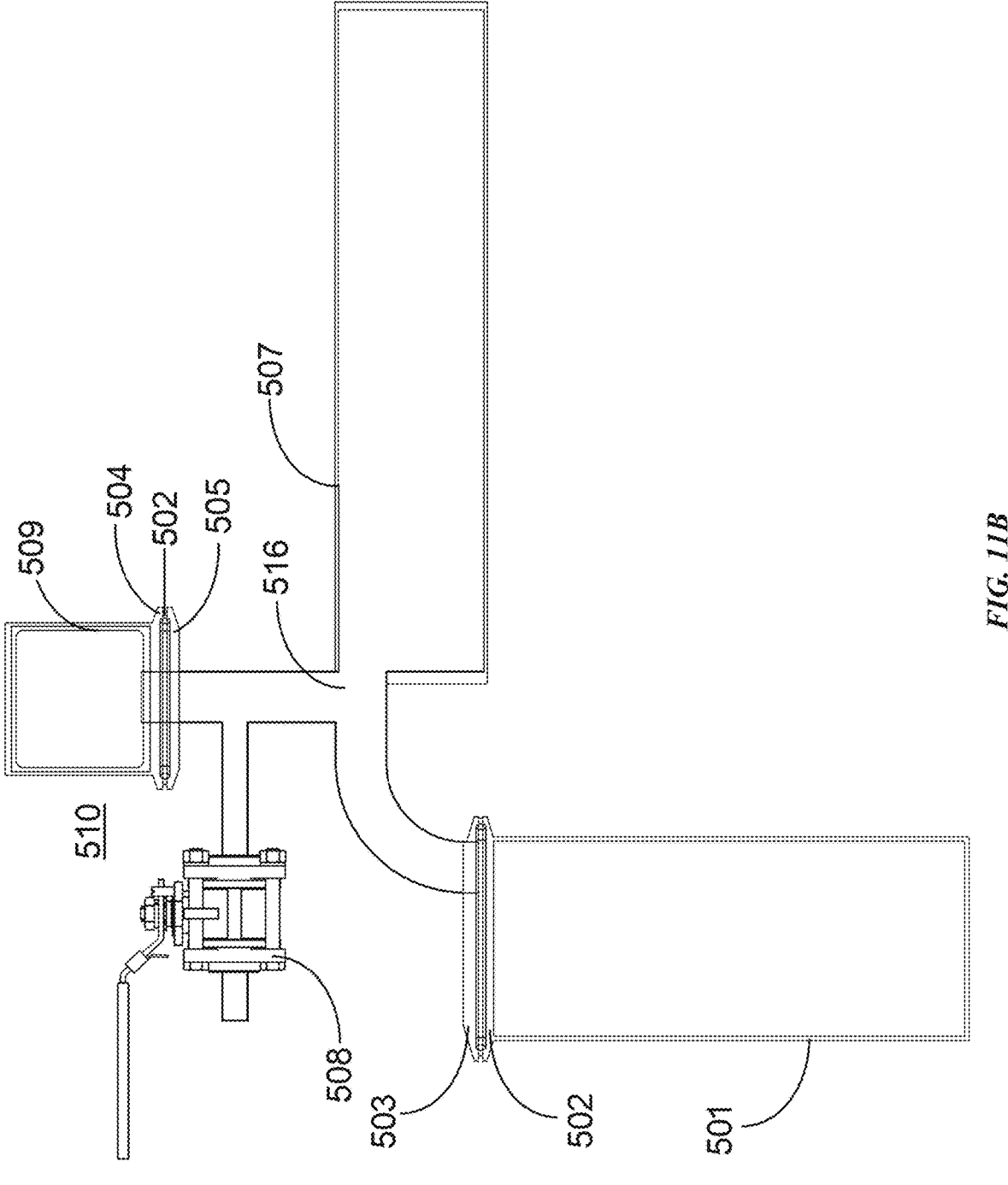
FIG. 11B shows a schematic drawing of a three-tube rotatable extraction system with a second fixed 90° orientation of two tubes and a third tube for isolated extract, according to an embodiment.
Figure 1I:
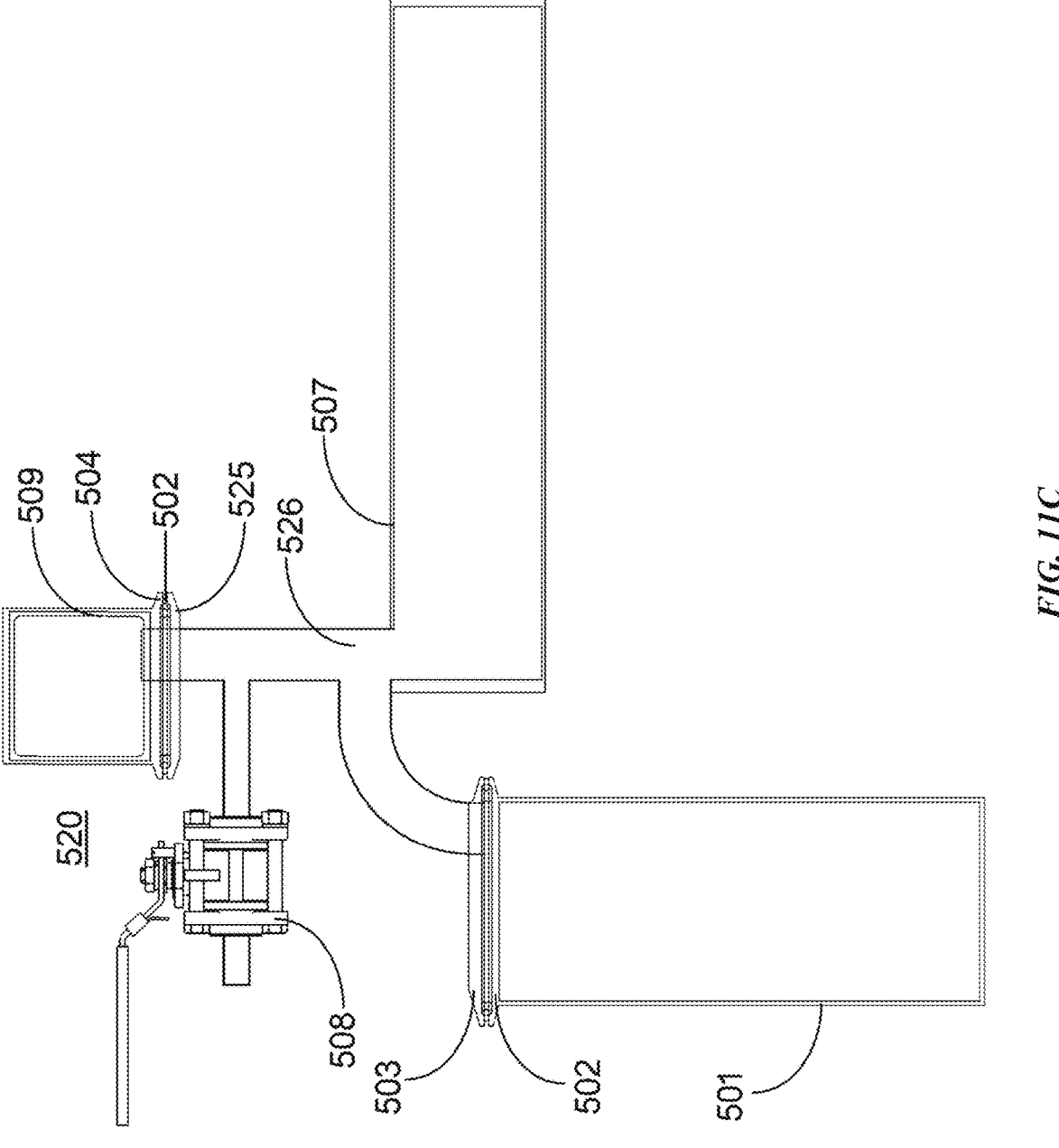

In a similar embodiment, as shown in FIG. 11B, an extraction system (510) differs from that shown in FIG. 11A, but the branched conduit pipe (516) is connected to an end sealed extract solution receiving tube 507 where the connection is held higher than cap 503 when oriented for distillation from extract solution receiving tube 507. This lowers the fluid path for transfers and decreases the surface area of the pipe but imposes a greater limit on the quantity of extract solution that it can contain.

In another similar embodiment, as shown in FIG. 11C, an extraction system (520) differs from that shown in FIG. 11A, but the branched conduit pipe (526) is connected to a sealed extract solution receiving tube 507 where the connection is held higher than cap 503 when oriented for distillation from extract solution receiving tube 507 but connection of the conduit pipe 526 is perpendicular to the length of extract solution receiving tube 507, which is advantageous to reduce accidental spillover and allows a greater filling with extract solution. Additionally, cap (525) resides close to an edge of the cap and is not centrally located such that pouring of the extract into the extract tube 509 allows pouring the extract down a surface of the extract tube 504 or the optional jar 509 to limit any splashing of extract.

Figures 12A, 12B:
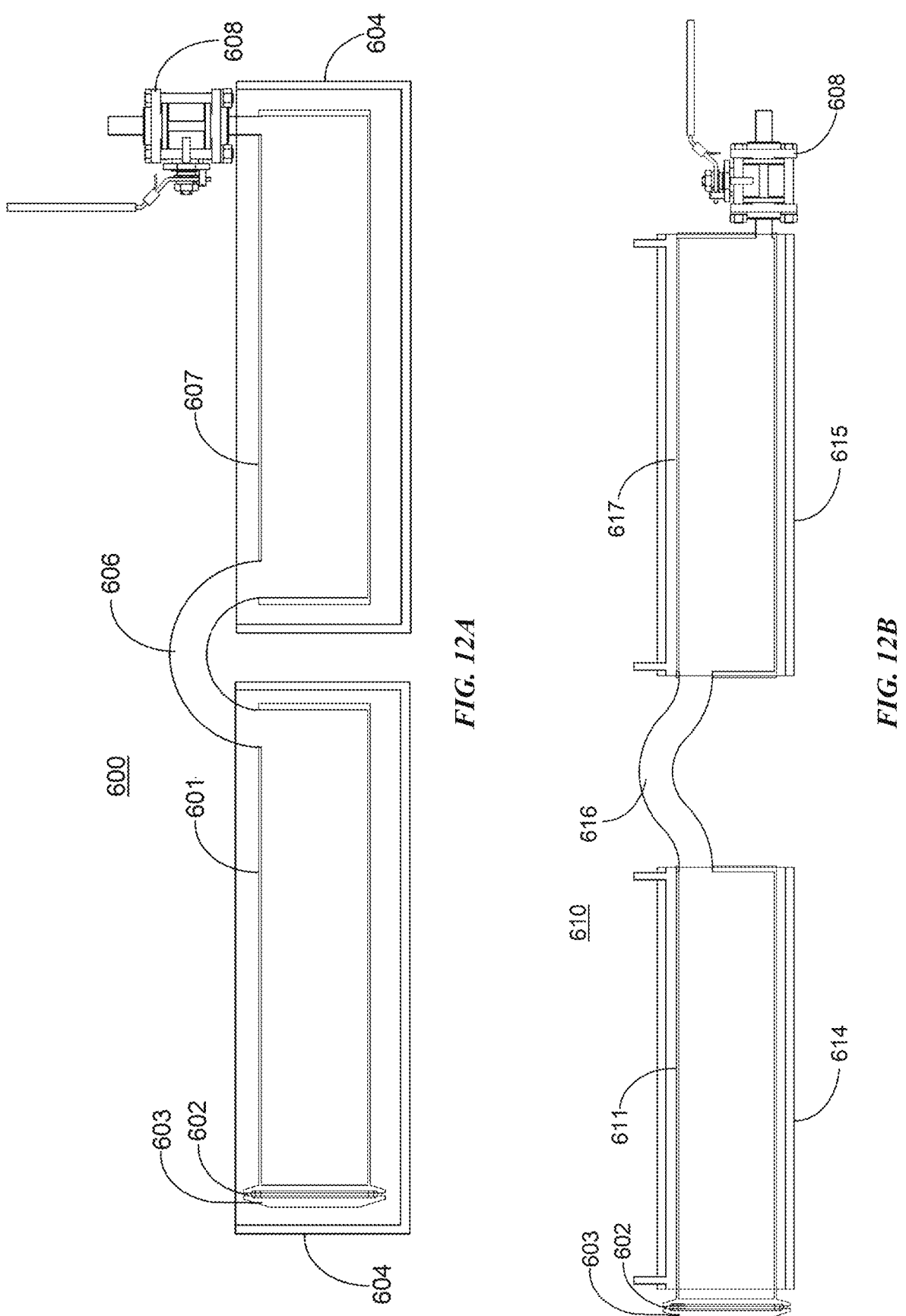
FIG. 12A shows a schematic drawing of a two-tube rotatable extraction system with a first fixed 180° orientation of two tubes, according to an embodiment.
FIG. 12B shows a schematic drawing of a two-tube rotatable extraction system with a second fixed 180° orientation of two tubes, according to an embodiment.

In yet other embodiments, the tubes can be held in a colinear fashion but separated by a curved pipe between the tubes. As shown in FIG. 12A, extraction system (600) includes an extractable material containing tube (601) with an end cap (603) sealed vi a gasket (602). Though no screen or filter is shown, one may be situated in or before the sealed connection to curved pipe (606), although the system is well suited for use of a filter bag about the extractable material. The extractable material containing tube 601 is shown situated in bath (604) for cooling or heating if needed. The curved pipe 606 is connected perpendicularly to the length of the extractable material containing tube 601 and an extract solution receiving tube (607), also shown situated in a bath 604, which is otherwise sealed at the receiving end and is connected to a perpendicular valve 608 at the otherwise sealed distal end to the curved pipe 606. In this system, the final extract drained through valve 608, alone or as an extract solution but not necessarily of higher concentration than the initial extract solution, occurs by tilting the entire apparatus by about 90-degrees.

In a similar embodiment to that in FIG. 12A, FIG. 12B shows extraction system (610), where the extractable material containing tube (601) with end cap 603 sealing via gasket 602. The extractable material containing tube 601 is shown surrounded laterally by a jacket (614) for cooling and heating as needed. The curved pipe (626) is connected in a coplanar manner to the length of the extractable material containing tube 601 and an extract solution receiving tube (627), also shown with a heating (or cooling) jacket (615), which otherwise is sealed at the receiving end and is connected to a colinear valve 608 at the otherwise sealed distal end to the curved pipe 626. In this system, the final extract drained through valve 608, alone or as an extract solution, allows maintenance of the colinear orientation or without any significant tilting.

Figure 12C:
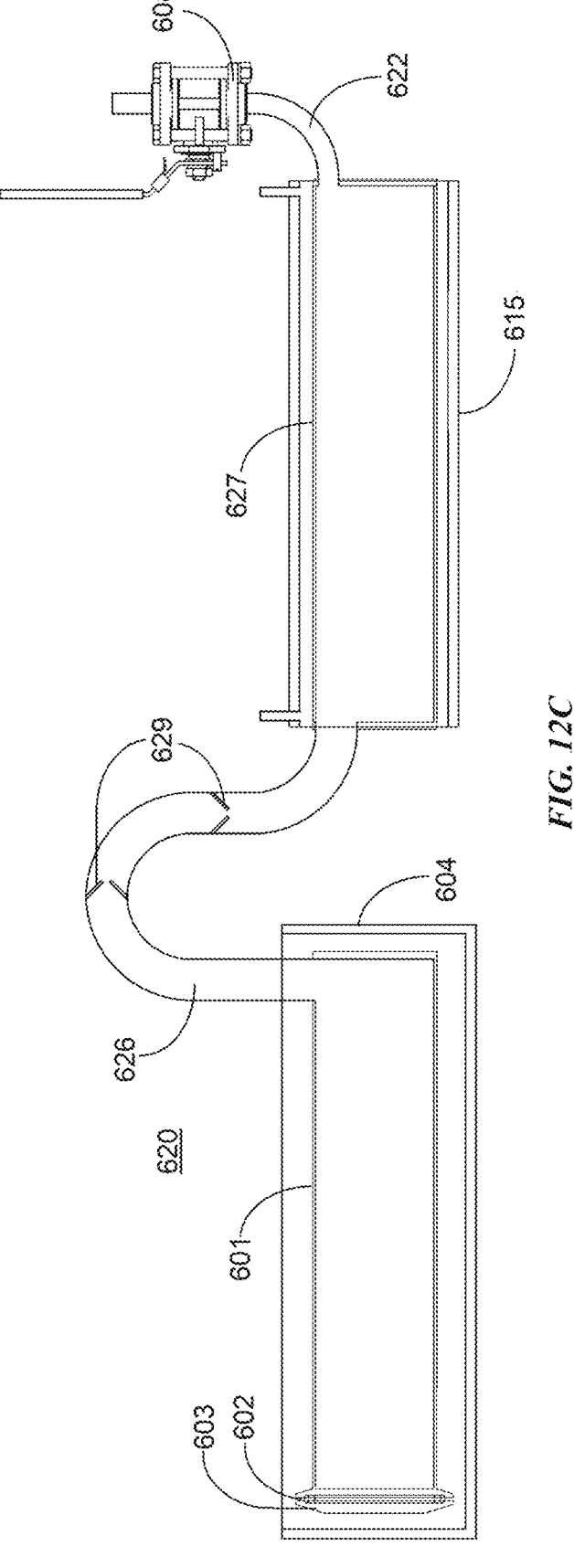
FIG. 12C shows a schematic drawing of a two-tube rotatable extraction system with a third fixed 180° orientation of two tubes, according to an embodiment.

In another embodiment, FIG. 12C shows extraction system (620), where the extractable material containing tube 601 with an end cap 603 sealed via gasket 602. The extractable material containing tube 611 is shown with a bath (604) for cooling and heating as needed. The curved pipe (626) is connected in a perpendicular manner to the length of the extractable material containing tube 611 and to an extract solution receiving tube (617), also shown with a heating (or cooling) jacket 615, although a long bath can be substituted. Extract solution receiving tube (617), is otherwise sealed at the extract solution receiving end and is connected to a colinear valve (608) at the end distal to the curved pipe 626. Curved pipe 626 is connected perpendicularly to extractable material containing tube 601 and colinearly with extract solution receiving tube 617. Additionally, curved pipe 626 is shown with optional internal features (629) to inhibit bumping of extract solution from extract solution receiving tube 617 to extractable material containing tube 601 while distilling solvent. In this system, the final extract is drained through valve 608, connected via a second curved pipe (622), neat or as an extract solution, generally of higher concentration than the initial extract solution drained from the extractable material by tilting the entire apparatus by about 90-degrees as shown for curved pipe 622, although the curved pipe 622 can be of less than 90-degrees, for example, but not limited to, 45-degrees.

Figure 12D:
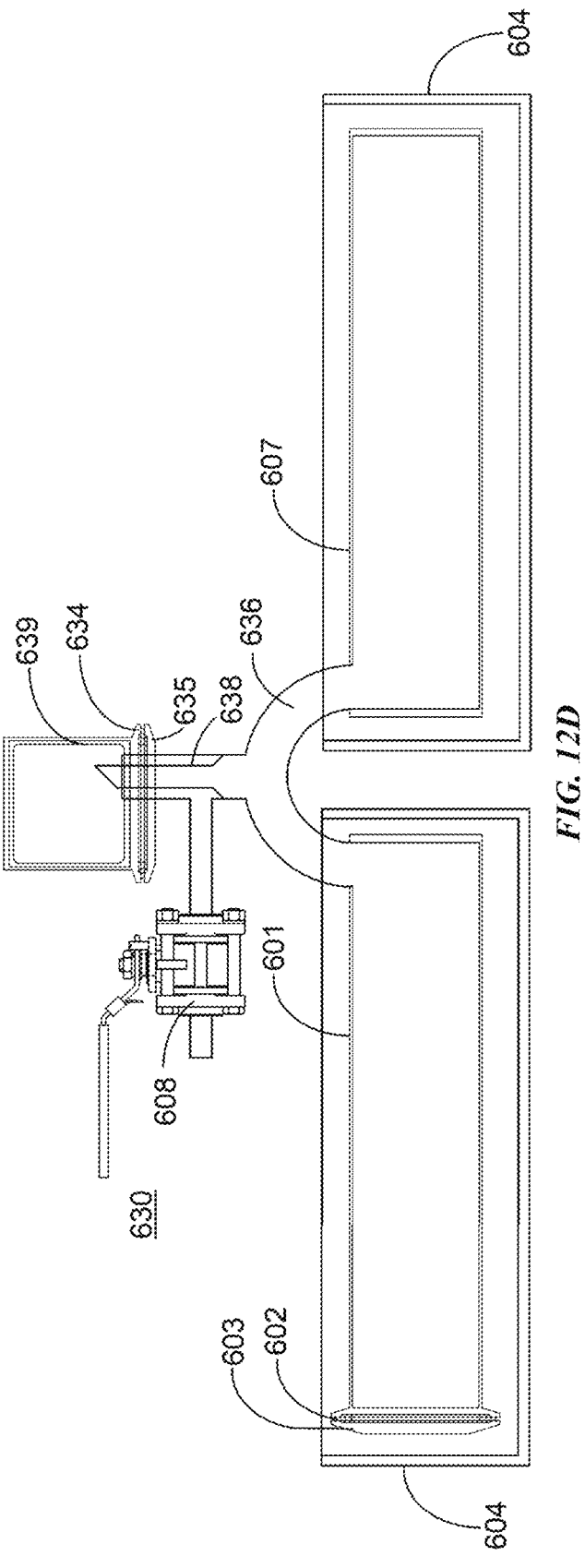
FIG. 12D shows a schematic drawing of a three-tube rotatable extraction system with a third fixed tube at a 90° orientation to the other two tubes, according to an embodiment

As shown in FIG. 12D, extraction system (630) includes an extractable material containing tube 601 with an end cap 603 sealed via gasket 602. The extractable material containing tube 601 is shown situated in bath 604 for cooling and heating as needed. The curved pipe (636) is connected perpendicularly to the length of the extractable material containing tube 601 and an extract solution receiving tube (637), also shown situated in a bath 604, which is otherwise sealed at the receiving end and is totally sealed at the distal end to the curved pipe 636. In this system, the final extract is drained through curved tube 636, alone or as an extract solution, through a branch pipe 638 welding or otherwise permanently sealed to an extract receiving cap (635) sealed via a gasket to an otherwise end sealed extract solution receiving tube (634). Branched pipe 636 includes an optional inner tube to inhibit extract solution or extract contamination of connected valve 608 for evacuating, solvent vapor addition, or solvent vapor removal with the extraction system 630. The extract tube 6345, as shown contains an optional jar (639) for directly packaging the extract during the extraction process.

The size of the rotatable extraction system and flexible extraction system can vary from sizes that accept 10 grams or less of plant material and ten grams or less of solvent and is easily manipulated manually to system that can accept more than ten kilograms of plant material and more than ten kilograms of solvent where various devices, as would be appreciated by one skilled in the art could readily identify, could be used to rotate at least a portion of the extraction system. Again, though description of the methods of using the extraction systems are consistent and most readily appreciated with tubes and the overall system having a size that can be readily manipulated manually without the aid of equipment, nevertheless, the invention is not so limited, and devices such as forklifts, jacks, hoists, supported axels, and/or other mechanical equipment, as can be used, as appreciated by those skilled in the art. The temperature at which the tubes are subjected can be imposed by a chilled or heated fluid in a Dewar flask or bath or the tube can include a jacket, through which a cool or warm fluid is passed. Temperature is maintained by the use heaters, chillers, or heat exchangers.

Evacuation is carried out with a one-stage, two-stage, or multi-stage pump. In some cases, a water aspirator can be employed where a modest vacuum is desired. When higher vacuums are needed, a second pump, such as, but not limited to a diffusion pump, can be included as desired or needed to achieve a desired pressure. The pressures employed can be from high vacuum, for example, but not limited to, $1\times10^{-6}$ Torr, to moderately high pressures of, for example, but not limited to, more than 300 PSI, as dictated by properties of the solvent employed. Temperatures can be controlled by cooling baths, heating baths, chilling coils, heating coils, infrared heaters, or any other method. Typical, non-limiting, temperatures employed can be those achieved with room temperature to boiling water and room temperature to water-ice baths, salt-water-ice baths, or dry ice baths. In a non-limiting example, a tube from which to distill the extraction solvent from a solution is placed in a warm water bath of approximately 43° C., such as a typical hot tap water temperature, and the second tube for reception of the solvent is cooled in an ice water bath of approximately 0° C. The temperatures employed will depend on the thermal stability of the extract and the requirements for vaporization and condensation of the solvent or solvent mixture employed. For example, boiling water, at about 100° C. can be used to heat a tube, whereas a salt-water-ice bath at about –18° C. can be used to cool a tube. Other cooling and heating sources using physical, radiative, electrical, or mechanical means can be used. The temperature and pressure conditions an appropriate mode of achieving and maintaining the temperature is readily appreciated by one of ordinary skill in the art. Final removal of solvent from the extraction system is facilitated by cooling a solvent storage container, for example, but not limited to, cooling with dry ice. Cooling to –78° C. can generate a high vacuum within the closed system using many solvents, even those with boiling points below –20°.

The tubes can be of any material, including plastics, glass, ceramic, metals, and composites of these materials, where, depending upon the extract and solvent employed and hence the temperatures and pressures employed, the material is chosen. For extracts for human ingestion, materials and polishes that meet established standards are often required. In like manner any gaskets, filters, and couplers often require conforming to standards. For example, metals can include 304 and 316 stainless steels, brass, or any other metal that is inert to the extract and solvent and approved for the extracts use. Internal surfaces of the components may be coated for effects such as the altering of the hydrophobicity or lipophilicity of one or more components and its compatibility with the extract or solvent to facilitate drainage, adherence, heat transfer, ease of cleaning, or any other factor. The internal surface may be rendered superhydrophobic and/or superoleophobicity by choice of the surface material and texture, as can be appreciated by those of skill in the art. External surfaces may be coated of one or more components to facilitate heat transfer, ease of cleaning, aesthetic qualities, or any other factor. Heat transfer and or the rate of extraction can be enhanced by, for example, heat pipes, piezo electric actuators, ultrasonic actuators, or any other devices included internally or externally to the tube and conduits of the extraction system.

Solvents that can be used include water, ammonia, or organic solvent, which can be selected from alcohols, hydrocarbons, ethers, fluorinated or other halogenated hydrocarbons, esters, amines, carboxylic acids, or any other solvents that are readily vaporized at temperatures of about 25° C. to about 150° C. when at pressures from about 0.1 mm Hg to about 760 mm Hg. All extracts must be considered with respect to the extracts compatibility or the desirability of a possible transformation by reaction with the solvent, among the solvents that can be used include, but are not limited to, methane, ethane, n-propane, n-butane, isobutane, pentane, isopentane, neopentane, cyclopentane, acetaldehyde, dimethyl ether, diethyl ether, ethyl bromide, methylene chloride, carbon disulfide, acetone, methyl acetate, chloroform, methanol, tetrahydrofuran, hexane, carbon tetrachloride, ethyl acetate, ethanol, benzene, cyclohexane, propanol, ethylene dichloride, heptane, dioxane, water, formic acid, toluene, butanol, octane, ethylene bromide, acetic acid, chlorobenzene, propionic acid, xylene, bromobenzene, turpentine, furfural, butyric acid, dimethyl formamide, dimethyl acetamide, dimethyl sulfoxide, phenol, aniline, propylene glycol, ethylene glycol, acetonitrile, pyridine, or any other solvent. The solvent can be a mixed solvent comprising more than one chemical compound. Depending on the use of the extract produced, the solvent should be carefully considered for the effect of any residual amounts of solvent may affect the appropriateness of its use. Mixtures of solvents may be employed, for example, a mixture of solvents with similar volatilities or in a composition where they form an azeotrope. Mixtures of solvents may be employed, where one of significantly lower volatility can resides in the extract in an intermediate or final state, where it can be removed from the extract in a second removal step from the extract within the rotatable extraction system or in a subsequent process carried outside of the rotatable extraction system.

Advantageous solvents that can be used include fluorocarbons, which, advantageously, are often non-toxic, non-carcinogenic and non-flammable. By proper use of the extraction systems herein, all these solvents can be maintained and collected in solvent reservoirs without release to the atmosphere. Useful fluorocarbons include, but not limited to, trifluoromethane, difluoromethane, fluoromethane, pentafluoroethane, pentafluorodimethyl ether, 1,1,2,2-tetrafluoroethane, 1,1,1,2-tetrafluoroethane, Bis(difluoromethyl)ether, 1,1,2-trifluoroethane, 1,1,1-trifluoroethane, methyl trifluoromethyl ether, 2,2,2-trifluoroethyl methyl ether, 1,2-difluoroethane, 1,1-difluoroethane, fluoroethane, 1,1,2,2,3,3,3-heptafluoropropane, trifluoromethyl 1,1,2,2-tetrafluoroethyl ether, 1,1,1,2,3,3,3-heptafluoropropane, trifluoromethyl 1,2,2,2-tetrafluoroethyl ether, 1,1,1,2,2,3-hexafluoropropane, 1,1,1,2,3,3-hexafluoropropane, 1,1,1,3,3,3-hexafluoropropane, 1,2,2,2-tetrafluoroethyl difluoromethyl ether, hexafluoropropane, 1,1,2,2,3-pentafluoropropane, pentafluoropropane, 1,1,2,3,3-pentafluoropropane, 1,1,1,2,3-pentafluoropropane, 1,1,1,3,3-pentafluoropropane, methyl pentafluoroethyl ether, difluoromethyl 2,2,2-trifluoroethyl ether, difluoromethyl 1,1,2-trifluoroethyl ether, 1,1,2,2-tetrafluoropropane, methyl 1,1,2,2-tetrafluoroethyl ether, trifluoropropane, difluoropropane, fluoropropane, 1,1,1,2,2,3,3,4,4-nonafluorobutane, 1,1,1,2,3,4,4,4-octafluorobutane, 1,1,1,2,2,3,3-heptafluorobutane, perfluoropropyl methyl ether, perfluoroisopropyl methyl ether, 1,1,1,3,3-pentafluorobutane, 1,1,3-trifluoropropane, 1,1,1,3,3-pentafluorobutane, 1,3-difluoropropane, 1,1-difluorobutane, 1,3-difluoro-2-methylpropane, 1,2-difluoro-2-methylpropane, 1,2-difluorobutane, 1,3-difluorobutane, 1,4-difluorobutane, 2,3-difluorobutane, 1,1,1-trifluoropentane, 1,1,1-trifluoro-3-methylbutane, 1,1-difluoropentane, 1,2-difluoropentane, 2,2-difluoropentane, 1,1,1-trifluorohexane, 3,3,4,4,5,5,6,6-nonafluoro-1-hexene, 1,1,3-trifluoropropane, 1,3-difluoropropane, 1,1,1,3,3-pentafluorobutane, 1,1-difluorobutane, 1,3-difluoro-2-methylpropane, 1,2-difluoro-2-methylpropane, 1,2-difluorobutane, 1,3-difluorobutane, 1,4-difluorobutane, 2,3-difluorobutane, 1,1,1-trifluoropentane, 1,1,1-trifluoro-3-methylbutane, 1,1-difluoropentane, 1,2-difluoropentane, 2,2-difluoropentane, 1,1,1-trifluorohexane, 3,3,4,4,5,5,6,6-nonafluoro-1-hexene, 1,1,2,2,3-pentafluoropropane, 1,1,1,3,3-pentafluoropropane, 1,1,3-trifluoropropane, 1,1,3-trifluoropropane, 1,3-difluoropropane, 2-(difluoromethyl)-1,1,1,2,3,3-hexafluoropropane, 1,1,2,2,3,3,4,4-octafluorobutane, 1,1,1,2,2,4-hexafluorobutane, 1,1,1,3,3,3-pentafluorobutane, 1,1-difluorobutane, 1,3-difluoro-2-methylpropane, 1,2-difluoro-2-methylpropane, 1,2-difluorobutane, 1,3-difluorobutane, 1,4-difluorobutane, 2,3-difluorobutane, 1,1,1,2,3,3,4,4-octafluoro-2-(trifluoromethyl)butane, 1,1,1,2,2,3,3,4,4,5,5-undecafluoropentane, 1,1,2,2-tetrafluorocyclobutane, 1,1,1-trifluoropentane, 1,1,1,2,2,3,4,5,5,5-decafluoropentane, 1,1,1,2,2,3,3,5,5,5-decafluoropentane, 1,1,1,4,4,4-hexafluoro-2-(trifluoromethyl)butane, 1,1,1-trifluoropentane, 1,1,1-trifluoro-3-methylbutane, 1,1-difluoropentane, 1,2-difluoropentane, 2,2-difluoropentane, 1,1,1-trifluorohexane, 1, 1, 1, 2, 2, 3,3,4,4,5,5,6,6-tridecafluorohexane, 1,1,1,2,2,5,5,5-octafluoro-4-(trifluoromethyl)pentane, 1,1,1-trifluoroethane, 3,3,4,4,5,5,6,6-nonafluoro-1-hexene, 2,3,3,3-Tetrafluoropropene, trans-1,3,3,3-tetrafluoroprop-1-ene or any mixture thereof and any mixture with non-fluorinated solvents.

In embodiments an extract solvent can be included in the tube with the extractable material or in the extract solution tube, where the solvent is non-volatile under the temperature and pressure conditions employed in the extraction system. In this manner, the extract, for example, but not limited to, an otherwise solid extract to enhance transfer of the extract product or to place it in a form for use. The second solvent is a liquid that can be a small molecule or a mixture of small molecules, such as, but not limited to, ethanol, a moderate sized molecule or mixture of moderate sized molecules, such as but not limited to, coconut oil or olive oil, or a polymer, or polymer mixture.

The extractable material, for example, but not limited to, plant matter including but are not limited to: Acaica Catechu Heart Wood; Acidanthera; Adenophora; Adhatoda vasica; Adulsa; Agarwood; Agave Sisalana; Agrimory; Aiye; Ajowan Garom; Akebia Caulis; Alfalfa; Algae; Alisma; Almond; Aloe Veraract; Aloe Vera; Alpine Herb; Althaea Officinalis; American Ginseng; Amicaract; Amlaract; Ammi Visnaga; Amyris; Andrographis Paniculata; Anemarhenae Asphodeliodes; Angelica; Angelicae Pubescentis; Ani Seed; Anise; Annatto (Seed); Apricot; Apple (Peel); Arjuna; Armoise; Artemisia Absinthum; Artemisia Annua; Artichoke; Asafoetida; Ashwagandha; Asian ginseng; Asiasari radix; Asparagus; Astragalus; Avocada; Avocadoract; Augustiflora Hill; Azelia; Bacopa Monnieri; Baheda; Bala; Balsam Popular (Buds); Banabaract; Barberry; Barley Grass; Basibolol; Basil; Bay; Belladonna; Bergamote; Beta-Carotene; Betulae Folium; Bhringraj; Bilberry; Birch; Bitter Melon; Bitter Sophora; Black Bean; Black Cohosh; Black Mustard (Seed); Black Pepper (Corns); Black Sesameract; Black Tea (Dry Leaf); Blackberry; Borage; Boswellia Serrata; Brahmi; Brussel Sprout; Buchu; Bufonis Venenum; Bulgarian Tribulus; Bupleurum; Burdock; Butea Superba; Cabbage; Cabreuva; Cajuput; Calamus; Calendula Officinalis; Camomile; Cannabis; Cananga java; Capcicum; Caralluma fimbriata; Caraway; Cardamom; Carline Thistle; Carnations; Carrot; Carum Carvi; Caryophylli; Cascara Sagrada; Cascarilla; Cassia; Cat Mint; Cat's Claw; Caulis Spatholobi; Cayenne; Cedar; Celery; Celery (Seed); Centella asiatica; Cepae; Chamomile; Chasteberry; Cherry; Chicory; Chilli (Seed); Chilli (Whole Pod); Chinese wolfberry; Chives; Chlorella Powder; Chrysanthemum; Chocolate; Chrysin; Cinamomi cortex; Cinidium; Cinnamon; Cistanche Deserticola Ma; Cistanchis herba; Cistus Spain; Citrata; Citronella; Citriodora; Citrus Aurantinum; Civet; Clary Sage; Clementine; Cloves; Coccinia Indica; Coconut; Cocoa (Powder); Cocos Nucifera; Codonopsis; Coffee (Arabica); Coffee (Robusta; Cola; Coleus Aromaticus; Coleus Forskohlii; Commiphora Myrrh; Copaiba; Coptis; Cordycepsract; Coriander (Cilantro); Coriander (Seed); Coriolus Mushroom; Cornsilk; Corus Officinals; Corydalis Yanhusuo; Costus; Cranesbill; Cucumber; Cumin; Cumin (Seeds); Curcumin; Cuscutae Seed; Cypress; Cypriol; Dahurian Rhodoendron; Damiana; Dandelion; Datura; Davana; Devil's Claw; Dill; Dill (Seed); Dryopteris; Echinacea Angustifolia; Echinacea Purpurea Herb; Elder Berries; Elder Flower; Elecampane; Elemi; Epilobium; Epimedium; Eucalyptus; Eucommia; Eurycoma Longifolia; Evening primrose; Evodia; Eyebright Herb; Fennel; Fennel (Seed); Fenugreek; Fenugreek (Seed); Fever Few; Fig Leaves; Flaxseed Hullract; Forsythia Suspensa; Freesia; Fucus Vesiculosus; Galbanum; Garcinia Cambogia; Garden Pinks (Clove Pinks); Garlic; Gastrodia Rhizoma; Gentian; Geranium; Ginger; Ginger (Root); Gingergrass; Gingko Biloba; Ginseng Root; Glucomannan; Glycyrrhiza glabra; Gokhru; Golden rod; Golden Seal Root; Gotu Kola Herb; Grape; Grapefruit; Green Bell Pepper; Green Tea; Griffonia Simplicifolia; Guarana; Guayacwood; Guduchi; Guggul; Gurjum; Gymnema Sylvestre; Gynostemma; Harda; Hawthorn; Hazel Nut; Hedyotis diffusa; Heena; Heliotrope; Hemp; Hibiscus; Honey Suckle; Hoodia Gordonit; Hop; Hop Pellets "Wye Target"; Horny Goat Weed; Horse Chest Nut; Horsetail; Houttuynia; Huperzia Serrata; Hyacinth; Hydrangea; Hysoop; Iberis Amara; Inula racemosa; Isatis Indigotica Fort; Isatis; Ivy; Jaiphal; Jamun; Jasmine; Jatamasi; Javitri; Jethimadhu; Jojoba; Jonquil; Juniper; Juniperis Communis L.; Kale; Kalonji Nigella; Kapoor Kachari; Karanj; Karela; Kashmiri Sounff; Kaua Piper; Kawa; Kawach; Kiwi; Kola Nut; Kalonji Nigella Korean Ginseng; Kudzu; Laminana Sacchanina; Laurel; Lavender; Lavendula; Leek; Lemon; Lemon Blossom; Lemon geranium; Lemongrass; Lichens; Ligustrum; Lily (Regale); Lily of the Valley; Lime; Lipia Citriodora; Liquorice; Litsea Cubeba; Lobelia Intiata; Longan Aril; Lonicera japonica; Loquat;

Lotus; Lovage; Lovage Seed; Luo Han Guo; Lycium; Lyco-
pene Tomato; Lycoris Radiata Herb; Ma Huang; Macada-
mia; Mace; Macleaya Cordata; Magnolia Bark; Maitake
Mushroom; Majoram Spain; Malva Verticillata; Mandarin;
Mangosteenract; Manjistha; Marigold; Marijuana; Marjo-
ram; Meadow Sweet; Medicago; Melissa Officinalis;
Melissa; Mentha Arvensis; Mentha Piperita; Mentha Usa
Willamette; Meswak; Methi; Methysticum Root; Mignione-
tire; Milk Thistle; Morinda Citrifolia; Morinda; Moringa;
Motherwort; Moutan Black; Mucuna Pruriens; Mugwort;
Mulberry; Mustard; Myrrh; Myrtle; Nardostachytis; Narcis-
sus; Neem; Neem (Azadirachta Indica Seed); Neroli; Nettle;
Niaouli; Nicotiana; Nicotiana Tobacum; Nirgundi; Notog-
inseng; Notopterygium; Nuphar Pumilum; Nutgrass; Nut-
meg; Oat Straw; Ocimum sanctum; Oleoresin Capsicum;
Olibanum; Olive; Onion; Oolong Tea; Ophiopogonis; Opo-
ponax; Orange; Orange Blossom; Oregano; Origanum Car-
vacrol; Orris Root; Paeonia Lactiflora Pall; Palmarosa;
Papain; Papaya; Paprika; Parsley; Passiflora Incarnata; Pas-
sion Flower; Patchouli; Peach; Peanut; Pennyroyal; Pepper;
Peppermint; Perilla; Petitgrain; Petroselini Radix; Phaseoli
Percarpium; Philadelphus; Phyllanthus Emblica; Pimento
Berry Pimento; Pine; Pineapple; Pinelliae; Piper Longum;
Piper Nigrum; Plantago; Plantain; Podophyllotoxin; Podo-
phyllum Hexandrum; Pomegranate; Poncirus; Poppy Seed;
Poria Cocos; Portulaca Oleracia; Primulae; Prune; Pu Erh;
Pumpkin; Punnello Blossom; Pygeum Africanum; Pyre-
thrum; Quararibea Funebris; Quercetin; Rabdosia Japonica
Hara; Radix Platycodi; Radix Stemonae; Raspberry; Rau-
wolfia Serpentina; Red Clover; Red Peony; Red Wineract;
Reishi Mushroom; Rhizoma Drynaria; Rhodiola; Rhubarb;
Roses (>30 varieties); Rosehip; Rosemary; Rosewood; Rue;
Sage; Sage Officinalis; Sage Spain; Salacia Reticulata; Sal-
via; Sandalwood; Sarsaparilla; Sassafras; Saullea Vaginate;
Savory; Saw Palmetto; Sceletium; Schizandra; Schizene-
peta; Scopolia; Scultellaria; Sea Weed; Semen Coiois;
Semen Cuscutae; Senegae; Senna; Sesame; Shatavari;
Shavegrass; Sheelajit; Shiitake Mushroom; Shikakai; Sibe-
rian Ginseng; Siberian Milkwort; Sida Cordifolia; Siler;
Silybum Marianum; Sinomenine; Soy; Soya Bean; Spear-
mint; Spikenard; Spinach; Spirulina Powder; St. John Wort;
Star Aniseed; Stemonae; Stephania Cepharantha Hayata;
Stevia; Strawberry; Sty Rax; Suma Root; Summa; Sun-
flower; Tagar; Tagete; Tarragon; Tart Cherry; Tea (Black
Leaf); Tea Saponin; Tea Tree; Teasel; Terminalia Billerica;
Terminalia Chebula; Theaflavins; Thuja; Thyme; Thymus;
Tinospora Crispa; Tobacco Leaves; Tomato; Torilis
Japonica; Tribulus Terrestris; Triphala; Tuberose; Tulips;
Tulsi; Turmeric; Turpentine; Uva Ursi; Valerian; Vanilla;
Verbena Morocco; Vetiver; Vitex Agnus-Castus; Vitex; Vitis
Idaeae Follum; Wall Flower; Walnut; Watermelon; Wheat
Grass; Wheatgerm; White Atractrylodes; White Peony;
White Pepper; White Tea; Wild Yam; Willow; Wintergreen;
Witch Hazel; Wormwood; Yarrow; Yerbamate; Yew Nettles;
Ylangra; Yohimbe; Zeodary; and Ziziphi.

Extracts that are isolated using the extraction systems
according to embodiments, can be separated from any
residual solvent that is undesirable when the extract is
intended for ingestion by dissolving the extract in a safe
solvent that is of higher boiling point than the residual
solvent and distilling that solvent from the extract. Again,
the extraction system can be used at a pressure where the
temperature is maintained at a temperature that does not
cause any degradation of the desired natural components.
The safe solvent may azeotrope with the residual solvent
though this is not a necessary feature to remove the residual
solvent. In other cases, molecular sieves, absorbent carbon, ion exchange resins, or other solid materials may be placed
in a component of the extraction system to absorb the
undesired residual solvent. Analysis of the extracts by gas or
liquid chromatography (GC or LC) methods. The detector
can be a mass spectrometer, GCMS and LCMS), to dis-
tinctly identify the extracts components, including any
residual solvents.

The forgoing description is provided for illustration and
description and is not limiting of the disclosure, its appli-
cations, or uses. It is not intended to be exhaustive or to limit
the disclosure. Elements are interchangeable and combined
in embodiments that are not specifically shown or described.

I claim:

1. A closed rotatable extraction unit, consisting of:
an extraction tube with a conduit connection, for inclusion
of an extractable material, selected from the group:
a first tube with a closed-end and an open-end that is
sealed with a reversibly connectable cap with the
conduit connection through either the closed-end or
through the reversibly connectable cap; and
a first combination tube with a first-section with a
closed-end and a securing seal to a second-section
with a reversibly connectable cap with the conduit
connection through either the closed-end or through
the connectable cap and optionally with a mid-
section with an additional securing seal to connect
the first-section to the second-section through the
mid-section;
a solution-receiving tube with a conduit connection, free
of the extractable material for receiving an extract
solution, selected from the group:
a second tube with both ends closed with the conduit
connection through one end of the second tube and
a valve connected to the end without the conduit
connection;
a second tube with a closed-end and an open-end that
is sealed with a reversibly connectable cap with the
conduit connection through either the closed-end or
through the reversibly connectable cap, wherein
when the conduit connection is through the closed-
end, the reversible connectable cap is in the form of
a cup that includes a volume to collect an anticipated
volume of an extract; and
a second combination tube with a third-section with a
closed-end and a securing seal to a fourth-section
with a reversibly connectable cap with the conduit
connection through either the closed-end or through
the reversibly connectable cap, wherein, when the
conduit connection is through the closed-end, the
reversible connectable cap is in the form of a cup that
includes a volume to collect an anticipated volume of
an extract, and optionally a second mid-section with
an additional securing seal to connect the first-
section to the second-section through the second
mid-section;
a conduit directly connected to the conduit connections of
the extraction tube and the solution-receiving tube with
the conduit selected from the group:
a flexible hose as a single portion or a first portion and
a second portion, where single portion or the first
portion and the second portion include one or two
interruptions; and
a bent rigid pipe that is a single portion or is partitioned
into a first portion and a second portion wherein at
least one portion is bent one to three times where the
single portion or the first portion and the second
portion include one or two interruptions; and a conduit's connectivity selected from the group:

uninterrupted between the conduit connections when the solution-receiving tube has a valve;

uninterrupted between the conduit connections with a conduit attached two-way valve;

interrupted, where the one or two interruptions are by one or two pairs of complementary quick-disconnect valves; and interrupted, where one of the one or two interruptions is by a three-way valve and the other of the one or two interruptions is by a pair of complementary quick-disconnect valves;

wherein the pair of complementary quick-disconnect valves, the three-way valve, or the attached two-way valve resides at any position within the length of the conduit including, but not limited to, directly connect to the conduit connection of the extraction tube and the conduit connection of the solution-receiving tube, wherein a rotation of all or a portion of the extraction unit places the extraction tube at a first position above the solution-receiving tube for a liquid solution transfer and the extraction tube at a second position of equal height or below the solution receiving tube for a solvent vapor transfer.

2. The closed rotatable extraction unit according to claim 1, wherein the conduit is a flexible hose.

3. The closed rotatable extraction unit according to claim 1, wherein the conduit is the bent rigid pipe.

4. A closed rotatable extraction unit, consisting of:

an extraction tube with a conduit connection, for inclusion of an extractable material, selected from the group:

a first tube with a closed-end and an open-end that is sealed with a reversibly connectable cap with the conduit connection through either the closed-end or through the reversibly connectable cap; and a first combination tube with a first-section with a closed-end and a securing seal to a second-section with a reversibly connectable cap with the conduit connection through either the closed-end or through the connectable cap and optionally with a mid-section with an additional securing seal to connect the first-section to the second-section through the mid-section;

a solution-receiving tube with a conduit connection, free of the extractable material for receiving an extract solution, selected from the group:

a second tube with both ends closed with the conduit connection through one end of the second tube and a valve connected to the end without the conduit connection;

a second tube with a closed-end and an open-end that is sealed with a reversibly connectable cap with the conduit connection through either the closed-end or through the reversibly connectable cap, wherein when the conduit connection is through the closed-end, the reversible connectable cap is in the form of a cup that includes a volume to collect an anticipated volume of an extract; and a second combination tube with a third-section with a closed-end and a securing seal to a fourth-section with a reversibly connectable cap with the conduit connection through either the closed-end or through the reversibly connectable cap, wherein, when the conduit connection is through the closed-end, the reversible connectable cap is in the form of a cup that includes a volume to collect an anticipated volume of an extract, and optionally a second mid-section with an additional securing seal to connect the first-section to the second-section through the mid-section;

a solvent-receiving tube for containing solvent removed from the extract solution selected from the group:

a third tube with a closed-end and an open-end that is sealed with a reversibly connectable cap with the conduit connection through the reversibly connectable cap; and a third tube with two closed-ends with the conduit connection at one closed-end;

a conduit directly connected to the conduit connections of the extraction tube, the solution-receiving tube, and the solvent-receiving tube with the conduit selected from the group:

a t-structure or a t-connector;

a t-structure or a t-connector with a second t-structure or a second t-connected to a two-way valve;

a pair of complementary quick-connect valves with a three-way valve; and a t-structure or a t-connector connected to a two-way valve with a three-way valve being the t-conector; and wherein the conduit is selected from the group:

a flexible hose as a single portion, two portions or three portions;

a rigid pipe as a single portion, two portions or three portions wherein at least one portion is bent one to three times;

a combination of one or two portions that are a rigid pipe and one portion is a flexible hose; and a combination of one or two portions that are a flexible hose and one portion is a rigid pipe;

a conduit's connectivity selected from the group:

uninterrupted between the conduit connections attached to the extraction tube, the solution-receiving tube, and the solvent-receiving tube;

uninterrupted between the conduit connections with a conduit attached two-way valve;

interrupted where one interruption, two interruptions, or three interruptions are by a pair of complementary quick-disconnect valves; and interrupted, where one of the one, two, or three interruptions is by a three-way valve and other of the one, two, or three interruptions is by a pair of complementary quick-disconnect valves; and wherein the pair of complementary quick-disconnect valves, the three-way valve, or the attached two-way valve resides at any position within the length of the conduit including, but not limited to, directly connect to the conduit connection of the extraction tube, the conduit connection of the solution-receiving tube, and the solvent receiving tube, wherein a rotation of all or a portion of the extraction unit places:

the extraction tube at a first position above the solution-receiving tube for a liquid solution transfer;

the solvent receiving tube at a second position of equal height or below the extraction tube for a solvent vapor transfer to the extraction tube; or the solvent receiving tube at a second position of equal height or below the solvent receiving tube for a solvent vapor transfer to the solvent receiving tube.

5. A closed rotatable extraction unit, consisting of:

an extraction tube with a conduit connection, for inclusion of an extractable material, selected from the group:

a first tube with a closed-end and an open-end that is sealed with a reversibly connectable cap with the conduit connection through either the closed-end or through the reversibly connectable cap; and a first combination tube with a first-section with a closed-end and a securing seal to a second-section with a reversibly connectable cap with the conduit connection through either the closed-end or through the connectable cap and optionally with a mid-section with an additional securing seal to connect the first-section to the second-section through the mid-section;

a solution-receiving tube with a conduit connection, free of the extractable material for receiving an extract solution, selected from the group:

a second tube with both ends closed with the conduit connection through one end of the second tube and a valve connected to the end without the conduit connection;

a second tube with a closed-end and an open-end that is sealed with a reversibly connectable cap with the conduit connection through either the closed-end or through the reversibly connectable cap, wherein when the conduit connection is through the closed-end, the reversible connectable cap is in the form of a cup that includes a volume to collect an anticipated volume of an extract; and a second combination tube with a third-section with a closed-end and a securing seal to a fourth-section with a reversibly connectable cap with the conduit connection through either the closed-end or through the reversibly connectable cap, wherein, when the conduit connection is through the closed-end, the reversible connectable cap is in the form of a cup that includes a volume to collect an anticipated volume of an extract, and optionally a second mid-section with an additional securing seal to connect the first-section to the second-section through the mid-section;

a conduit directly connected to the conduit connections of the extraction tube and the solution-receiving tube with the conduit selected from the group:

a flexible hose as a single portion or a first portion and a second portion, where the first portion and the second portion are separated by an interruption; and a bent rigid pipe that is a single portion or is partitioned into a first portion and a second portion wherein at least one portion is bent one to three times where the first portion and the second portion are separated by one or two interruptions;

a conduit's connectivity selected from the group:

uninterrupted between the conduit connections when the solution-receiving tube has a valve;

uninterrupted between the conduit connections with a conduit attached two-way valve;

interrupted, where the one or two interruptions are by a pair of complementary quick-disconnect valves; and interrupted, where one of the one or two interruptions is by a three-way valve and the other of the one or two interruptions is by a pair of complementary quick-disconnect valves;

an extract-isolating tube for collecting an extract from the solution, wherein the extract tube has a close-end and an open-end that is sealed with a reversibly connectable cap with a conduit; and wherein the conduit further consists of an interruption or an additional interruption selected from the group:

a t-structure or a t-connector;

a t-structure or a t-connector with a second t-structure or a second t-connected to a two-way valve;

a pair of complementary quick-connect valves with the three-way valve; and a t-structure or a t-connector connected to a two-way valve with the three-way valve; and wherein the extraction tube, solution-receiving tube, and the extract-receiving tube are connected through the t-structure, the t-connector, or the three-way valve.

6. A method of extraction comprising:

providing a closed rotatable extraction unit according to claim 1;

placing an extractable material in an extraction tube;

evacuating the extraction tube, the solution-receiving tube, and the conduit;

placing a solvent into the extraction tube to fully contact the extractable material;

maintaining the contact of the solvent with the extractable material to form an extract solution;

raising the extraction tube above the solution-receiving tube;

draining the extract solution from the extraction tube to the solution-receiving tube;

lowering the extraction tube to a level of the solution-receiving tube or lower;

warming the solution-receiving tube and/or cooling the extraction tube;

distilling the solvent from the solution-receiving tube to the extraction tube leaving an extract in the solution-receiving tube;

optionally repeating, one or more times, the steps of maintaining, raising, draining, lowering, warming and/or cooling, and distilling; and isolating the extract from the solvent-receiving tube.

7. A method of extraction comprising:

providing a closed rotatable extraction unit according to claim 4;

placing an extractable material in an extraction tube;

evacuating the extraction tube, the solution-receiving tube, and the conduit;

placing a solvent into the extraction tube to fully contact the extractable material;

maintaining the contact of the solvent with the extractable material to form an extract solution;

raising the extraction tube above the solution-receiving tube;

draining the extract solution from the extraction tube to the solution-receiving tube;

placing the solvent-receiving tube at a level of the solution-receiving tube or lower;

warming the solution-receiving tube and/or cooling the solvent-receiving tube;

distilling the solvent from the solution-receiving tube to the solvent-receiving tube;

optionally pouring or vapor transferring the solvent from the solvent-receiving tube to the extraction tube;

optionally repeating, one or more times, the steps of maintaining, raising, draining, placing, warming and/or cooling;, distilling, and optionally pouring or vapor-transferring, where the optionally pouring or vapor transferring is carried out one less time than the other steps; and isolating the extract from the solution-receiving tube.

8. A method of extraction comprising:

providing a closed rotatable extraction unit according to claim 5;

placing an extractable material in an extraction tube;

evacuating the extraction tube, the solution-receiving tube, and the conduit;

placing a solvent into the extraction tube to fully contact the extractable material;

maintaining the contact of the solvent with the extractable material to form an extract solution;

raising the extraction tube above the solution-receiving tube;

draining the extract solution from the extraction tube to the solution-receiving tube;

lowering the extraction tube to the level of the solution-receiving tube or lower;

warming the solution-receiving tube and/or cooling the extraction tube;

distilling the solvent from the solution-receiving tube to the extraction tube leaving a concentrated extract solution in the solution-receiving tube;

optionally repeating, one or more times, the steps of maintaining, raising, draining, lowering, warming and/or cooling, and distilling;

orienting the solvent-receiving tube above the extract-receiving tube;

pouring the concentrated extract solution from the solution-receiving tube into the extract-receiving tube;

washing a residual extract in the solution-receiving tube into the extract-receiving tube with the solvent by vapor transferring from the extract-receiving tube onto walls of the solution-receiving tube;

optionally, evaporating the residual solvent from the concentrated extract in the extract-receiving tube to form an extract, and isolating the extract or the concentrated-extract solution from the extract-receiving tube.

\* \* \* \* \*